US011657390B2

(12) United States Patent
Xu

(10) Patent No.: US 11,657,390 B2
(45) Date of Patent: May 23, 2023

(54) CODECHAIN-BASED MODELS, APPARATUSES, SYSTEMS, METHODS, AND APPLICATIONS OF THE SAME

(71) Applicant: Wei Xu, Shanghai (CN)

(72) Inventor: Wei Xu, Shanghai (CN)

( * ) Notice: Subject to any disclaimer, the term of this patent is extended or adjusted under 35 U.S.C. 154(b) by 0 days.

(21) Appl. No.: 16/762,788

(22) PCT Filed: Nov. 6, 2018

(86) PCT No.: PCT/CN2018/114142
§ 371 (c)(1),
(2) Date: May 8, 2020

(87) PCT Pub. No.: WO2019/091371
PCT Pub. Date: May 16, 2019

(65) Prior Publication Data
US 2021/0192505 A1 Jun. 24, 2021

(30) Foreign Application Priority Data
Nov. 8, 2017 (CN) .......................... 201711108224.4

(51) Int. Cl.
*G06Q 20/38* (2012.01)
*G06Q 20/10* (2012.01)
(Continued)

(52) U.S. Cl.
CPC ....... *G06Q 20/3821* (2013.01); *G06Q 20/102* (2013.01); *G06Q 20/326* (2020.05); *G06Q 20/4014* (2013.01)

(58) Field of Classification Search
None
See application file for complete search history.

(56) References Cited

U.S. PATENT DOCUMENTS 7,349,871 B2 * 3/2008 Labrou ................. G06Q 20/02
705/26.35
9,117,231 B2 8/2015 Rodgers et al.
(Continued)

FOREIGN PATENT DOCUMENTS

CN 105354747 A 2/2016
CN 105719139 A 6/2016
(Continued)

OTHER PUBLICATIONS

International Search Report issued in Counterpart PCT Application No. PCT/CN2018/114142.
(Continued)

*Primary Examiner* — Namrata Boveja
*Assistant Examiner* — Amit Patel
(74) *Attorney, Agent, or Firm* — Amster, Rothstein & Ebenstein LLP

(57) ABSTRACT

Disclosed are CodeChain-based models, apparatuses, systems, methods, and applications. When implementing interaction based on CodeChain, each digital person has identity information, the identity information corresponding to a person represented by the digital person and/or the terminal device used by the person; the method comprising: identifying, by the terminal device, a coding medium generated according to a CodeChain access protocol so as to enable the digital person to access a CodeChain network on behalf of the person; and performing data transfer with another digital person and/or system according to entrustment of the person. Through identification of the coding medium, the access address of the code chain server is obtained, and then the address of the server which actually provides services is obtained from the CodeChain server, such that the service is obtained by providing a service parameter as required.

8 Claims, 6 Drawing Sheets

(51) Int. Cl.
*G06Q 20/40* (2012.01)
*G06Q 20/32* (2012.01)

(56) References Cited

U.S. PATENT DOCUMENTS

| | | |
|---|---|---|
| 2014/0114776 A1 | 4/2014 | Solanki et al. |
| 2015/0278820 A1 | 10/2015 | Meadows |
| 2015/0324789 A1 | 11/2015 | Dvorak et al. |
| 2016/0055598 A1 | 2/2016 | Ramini |

FOREIGN PATENT DOCUMENTS

| | | |
|---|---|---|
| CN | 105812957 A | 7/2016 |
| CN | 106850772 A | 6/2017 |
| CN | 106850773 A | 6/2017 |
| JP | 3150729 U | 6/2009 |
| JP | 2011-145895 A | 7/2011 |
| JP | 2013-080329 A | 5/2013 |
| JP | 2017-016599 A | 1/2017 |
| KR | 10-2004-0054445 A | 6/2004 |
| WO | 2014-123495 A1 | 8/2014 |

OTHER PUBLICATIONS

Written Opinion issued in issued in Counterpart PCT Application No. PCT/CN2018/114142.
Japanese Office Action dated May 18, 2021 issued in Japanese Patent Application No. 2020-544092.
Russian Office Action dated Sep. 10, 2020 issued in Russian Patent Application No. 202091149.
Russian Office Action dated Apr. 26, 2022 issued in Russian Patent Application No. 202091149.
African Office Action dated Apr. 21, 2022 issued in African Patent Application No. AP/P/2020/012455.
Supplementary European Search Report dated Jul. 15, 2021 issued in European Patent Application No. 18875110.1.
EPO Communication Pursuant to Rules 70(2) and 70a(2) EPC dated Aug. 3, 2021 issued in European U.S. Appl. No. 18875110.1.
Korean Office Action dated Dec. 16, 2021 issued in Korean Patent Application No. 10-2020-7016445.
Korean Office Action dated Jun. 29, 2022 issued in Korean Patent Application No. 10-2020-7016445.
Australian Examination Report No. 1 dated Jun. 3, 2021 issued in Australian Patent Application No. 2018364103.
International Search Report dated Feb. 12, 2019 issued in PCT International Patent Application No. PCT/CN2018/114142.
Written Opinion dated Feb. 12, 2019 issued in PCT International Patent Application No. PCT/CN2018/114142.

* cited by examiner

CODECHAIN-BASED MODELS, APPARATUSES, SYSTEMS, METHODS, AND APPLICATIONS OF THE SAME This application is a National Stage entry under 35 U.S.C. 371 of International Patent Application No. PCT/CN2018/114142, filed on Nov. 6, 2018, which claims priority from Chinese Patent Application No. CN 201711108224.4, filed Nov. 8, 2017, the entire contents of each of which are incorporated by reference herein.

FIELD

Embodiments of the present disclosure relate to fields of IoT and digital persons, but not limited thereto, particularly relate to a new network access mechanism, and more particularly relate to CodeChain-based models, apparatuses, systems, methods, and applications of the same.

BACKGROUND

Rapid population of portable smart devices such as smart phones not only facilitates the life of people and communications between people, but also triggers Internet revolution. A large number of new information transmission manners have emerged, and new business models have been established accordingly. However, constrained by conventional Internet theories, the current business models are still implemented by people based on the interaction between webpages (or APPs) and operators. This interaction mode fails to sufficiently study the features, methods, and models of interactions between people and objects in daily life, such that the activities of people are artificially divided into online activities and offline activities, a consequence of which is that although the online and offline activities have a same business significance, online data and models are isolated from offline ones.

The traditional Internet is implemented based on IP link; while population of mobile terminals enables everyone to have a portable smart device, and in case of need, the mobile terminal may obtain information according to the instruction (intention, social status or social attitude) of a person and transmits such information to a business system.

The conventional human-nature and human-human interactions may be regarded as analog. In the traditional Internet world, the human-machine interaction is implemented via keyboard-mouse input, voice input, screen display, etc., which is inefficient; such human-machine interaction requires education, learning, and training so as to be widely adopted. Due to such limitations, the existing Internet business modes have to contribute a lot of money for design and promotion of human-machine interactions (so-called "Traffic Acquisition Costs").

A negative aspect of the current Internet economy lies in that an Internet monopoly barrier is present in Internet portals, payment services, commenting services, classification services, social services, and e-commerce platforms provided by service providers. Namely, although the Internet is flat in technical sense, in practical applications, information explosion of the Internet era forces the user to rely more on various universal services on the Internet to find a desired service. As such, the user not only loses its ownership of personal data, but also has to passively accept the inequalities in quality and price brought about various monopoly Internet commercial services. Particularly, the value of an Internet service company is contributed by every user, but it is the service company, instead of each one who contributes to the value, that is entitled to the added value. The present disclosure intends to overcome this deficiency, i.e., each act of each person contributing to the network value can be reflected in "CodeChain access and verification" to thereby offer a "positive feedback" to each digital person.

In recent years, with development of mobile Internet, people start accessing the Internet to get the things around them. Code scan brings the user an experience of "what you see is what you get", which gradually breaks the information monopoly barrier of Internet service providers, creating a new Internet economic pattern featured by sharing. Due to its flexibility, the share economy has been developing rampantly since its evolution and populated to the mass. However, since the share economy still uses the Internet technical infrastructure, various problems constantly arise.

For example, two-dimensional code virus, forged two-dimensional code, information tampering, personal information theft, paid information posters, which causes problems such as illegal P2P finance, illegal virtual currencies, illegal pyramid selling, illegal information sharing, particularly those problems concerning the fundamental economic activities in the life and work of common people), bring new challenges to the stability and unity of the country and to the harmonic life of people.

With promotion and population of two-dimensional codes, increasingly wider application has changed the access manner to a certain extent. However, use of two-dimensional codes is mostly based on applications on smart phones, such that the user has to find a corresponding App based on the nature of the target object and then initiate the camera to scan and identify. The whole process needs a high human involvement, which is still inconvenient for use.

The original intention for proposal and use of two-dimensional codes is mainly to solve the drawbacks of bar codes such as insufficient capacity and poor identifiability. The core of that technology is to read data from a static two-dimensional code with a two-dimensional code reader and process the data by a background server, thereby implementing the whole smart process. How, the whole process is also limited by the data volume of two-dimensional code, while the specifications and patterns for compiling various two-dimensional codes cause the reader and the compilation of background server even more complex.

It has been proposed to implement a "two-dimensional code scanning" process using two sets of servers. With this process, the two-dimensional code needn't save all data; instead, through an instruction linked to a second server, the processing server can obtain enough information hidden in the two-dimensional code, thereby completing the business processing process. In this way, the interactive data involved in one "two-dimensional scanning" process can be close to infinity, completely solving the capacity issue, and transmission of sensitive and confidential information also becomes more secure. This technology has been currently widely applied to a variety of fields such as two-dimensional code payment and bicycle-sharing and thus has become one of the fundamentals for building a new business model using IoT.

However, a business process such as WeChat payment which is implemented purely based on the "two-dimensional code scanning" technology has a critical defect. Because two-dimensional codes may be arbitrarily released and always contain a link directed to a second server, a person cannot know whether the second server is reliable during the scanning process; such that with a forged server and by hacking means of data theft and tampering, credit card piracy and fraud can be easily made.

The IoT has developed from various standalone data networks to a wide-area interconnected IoT: population and development of cloud computing technologies such as 5G and NB-LTE network; big data computation and artificial intelligence which changes mechanical computation to smart computation (ALPHA GO: deep learning, evaluation, probability decision), which, however, gradually deviates from human beings, because it is also originated from a wrong philosophy thinking mode "sum of parts equals to whole."

The current AI (artificial intelligence) is all based on the Internet/IoT, i.e., with the IP address as the underlying connection; and all equipped network access devices are based on IP address management. Such networking enables various nodes of the network to be IPs, i.e., machines, including networked computers, mobile phones, self-piloting automobiles, flights, refrigerators, air-conditioners, etc., even a part human, part machine with a chip implanted into the brain. All of the above have made "AI" evolved into a Homo Deus, i.e., can exist in a network space or at any time, any location (multiple locations), or not exist at any place, which is an embodiment of silicon-based civilization. However, because they are non-human and detached from human society, many chaos arises (hackers, paid posters, anonymities, etc.); meanwhile, a unidirectional "point-to-point link" cannot truthfully reflect the human society characteristics of a social communication.

The present disclosure is to highlight a "value expression" of "human society" (distinguished from robots), which may impart more significances to information via human intervention during the information propagation process. With a chained propagation manner (human-centered propagation based on personal relationship network), an information recipient may not only receive the original information, but also may obtain the attribute information given by the propagator; besides, more associated information may be obtained through the propagation chain, helping to make a more reasonable decision and activity. Further, such attribute information not only enables the recipient to obtain the propagation route of the information but also enables him to make a judgment on the authenticity, quality, and reasonableness of the connotations of the information.

However, the attribute information is superimposed by the propagator over the original information, which has the following characteristics: 1) subjectivity: the value assignment to the attribute bears the propagator's strong subjectivity, which varies with time, conditions of the propagator, and other objective elements. 2) forgeability: the credibility of the information can be changed very easily to seize personal interests. 3) propagation efficiency issue: due to the limits of contact range, the efficiency of chained propagation is slower and more inefficient than posting/forwarding over the Internet, such that its use probability will be lowered. 4) cost issue: to main reliability of the information on the propagation chain, a very high verification cost is required, which would cause linear increase of the information cost, thereby affecting the scope and frequency of use of the information.

Typical problems are the block chain technology and bit coins. As typical transaction ledger information which circulates over the Internet and requires a very high reliability, the block chain technology uses a cryptography algorithm and a voting model to verify the authentication of the transaction information, which builds, in the Internet, a set of complete and distributed chain database containing all transaction histories; however, over time, the difficulty of cryptography algorithm and the search difficulty of the chain database also increase exponentially. Apparently, such mode can only be maintained by continuous appreciation of bit coins, which apparently goes against objective rules.

Block chain is regarded as a revolutionary technology, because it solves the issue of information network decentralization, such that the network consensual credible information can be transmitted consensually; however, its problems are also very prominent. 1) high cost; 2) unable to cut off propagation of illegal and forged information of the information initiator. A prominent embodiment of the second problem is that block chain technology-based bit coils are widely applied in money laundering and cybercrime.

The block chain alleged that the advantages of a ledger are that all ledgers have a plurality of copies with the cryptographic technology, such that accounting fraud becomes impossible in future economic technologies; and that block chain 2.0 is present in accounting, i.e., each ledger corresponds to an economic activity, and underlying each economic activity is a contract or part of a contract, such that the block chain incorporates a second concept, i.e., smart contract; and the third advantage is that it changes a social credibility mechanism. In the business world, a plurality of interactions are required to build a trust between people; we call it as "time reveals a person's heart." However, with the Internet is powered with block chain, the credibility mechanism of the whole society undergoes a significant change, i.e., it is possible for strangers to build a trust at once. If one dares to fraud in the block chain, that means his death in the world. The third problem of block chain is critical: any machine-based consensus will bring disasters. Once one point is broken, the whole system would be paralyzed. The present disclosure believes that the consensus of human society should be a consensus mechanism based on the human beings per se, rather than machines based on IP addresses.

However, the endorsement of valuation and use of bit coins is based on a "community" (machine person community) verification based on IP addresses, which is a shame to the human society.

In the current Internet mode, the most typical e-commerce flow is as follows: a consumer logs on a merchant's website to access commodity information, places an order to the merchant, and pays via a third-party payment service provider upon confirmation of completion of the payment, the merchant delivers the items or provides other services. The third-party payment will be explained with a most typical merchant-acquiring service: when the payer transfers money to the bank account of the third-party payment service provider, the third-party payment service provider records the received amount on the merchant's account registered with the third-party payment service provider; then: based on the agreement between the collector and the payer, the collector is allowed, under certain conditions, to transfer its money in the account registered with the third-party payment service provider to the collector's bank account or draw cashes therefrom. During this process, the third-party payment service provider has a considerable amount of fund precipitation, which is usually referred to as reservation and always used by the third-party payment service provider for various kinds of financial value-added services, becoming an extra source of profits for the third-party payment provider.

The major problem for the existing e-commerce flow lies in that:

1) during the transaction process, the merchant is in a powerful position with respect information, who may push any non-checked commodity information to consumers, even false information to cheat the consumers to make a very irrational consumption decision.

2) existence of the third-party payment is due to the consumer's distrust in his payment to the merchant, which objectively creates another powerful party.

Due to the indispensability of the third-party payment and the economic interest relationship between the third-party payment service provider and the merchant, it frequently occurs that the merchant and the third-party payment service provider jointly deceive consumers.

3) during the entire transaction process, the merchant and the third-party payment service provider can easily access all information of the consumers, particularly the third-party payment service provider. In consideration of its own interests, the third-party payment service provider may comprehensively integrate the consumer's complete personal information according to existing rules of the banking regulatory commission; if such information is used for commercial purposes, the consumer's privacy will be greatly jeopardized.

4) From the technical perspective, in order to prevent illegal cyber activities such as fraudulent viruses, password theft, network attack, etc., the consumers have to use more personal information such as credentials, fingerprints, human faces, locations, etc., which are unrelated to the consumption, as personal identity certification (in contrast, the merchant only uses a digital credential as identity certification; the consumer's weak position is more prominent), posing a greater and more uncontrollable risk of leak the consumer's personal information. From another perspective, with increasingly higher costs of personal identity certification and risk control, the third-party payment service provider would have an impulse to utilize the consumer information data collected thereby for profiting.

Due to the powerful position of the third-party payment service provider, its illegal acts would cause great harm to the financial security of the whole country. In fact, the harms have been embodied in various aspects of national economic operation; prominently, a series of novel economic crimes rise rapidly, including: collusion between the third-party payment service provider and lawless merchants to practice Ponzi Scheme and Pyramid scheme; illegal cashing from credit cards via a third-party payment service provider; illegally trading the consumers' personal consumption data; illegal online gambling; telecommunications fraudulence, etc.

With emergence of new-model e-commerce modes such as offline code-scan payment, self-service supermarket, and Fresh Hema, etc., the above issues become more and more prominent, even the consumers enjoy the consumption convenience brought by new information technologies.

In the case of fourth-party payment, a fourth-party service provider provides an information agent service between the bank and the collector, such that there is no fund precipitation; under the current regulatory scheme, there is no third-party payment license required for fourth-party payment service providers. In actual operations, some fourth-party payment utilizes third-party payment services; in this case, the third-party payment service provider functions as a bank. Services provided by general banks and third-party payment service providers cannot satisfy the diverse demands, complexity, and automation of electronic payment service in the market; this is why the fourth-party payment emerges. However, how to ensure the convenience and security of fourth-party integrated payment is still an imminent problem to solve. The banking account system should maintain updated, while the solution does not lie in building up a network finance new account system (e-account system) with Class II and Class III accounts as the backbone, and the account-based management modes such as currency electronization of existing banking systems, security fund accounts of third-party payment companies, and pre-paid cards cannot catch up with the prevalent code-scan payment era. If the electronic currency is regarded as an account currency, then the account for internal settlement is fundamentally different from the service account. The service account may extend its functions infinitely, which are basic contradictions of account-based currencies such as a security fund account for the third-party payment company, a pre-paid card, Yuebao, Jieba, Huaba. The only solution is to launch a pure digital currency described in the present disclosure, i.e., CodeChain digital currency. The digital person management and the digital currency are used as media, while specialized accounts such as fund account cannot be used for payment:

Technically, a non-financing institution, e.g., third-party payment service provider, is not allowed to open a financial account. In practical operations, due to existence of transaction time lag and the account control right, in order to guarantee the transaction, an intermediate-state account exists between an information account and a financial account for the third-party payment service provider during the period from pre-payment and actual payment. The money in this part is referred to as reservation fund, which is deposited on the reservation account of the third-party payment service provider account. This corresponds to a savings account. The account structure under the management of current central bank system is a tree map. However, due to complexity of transaction and variability of payment conditions, opening of functional accounts is limitless, i.e., any transaction activity may derive many intermediate-state functional accounts. This is the fundamental contradiction point between the current account currency system and the complex and variable network transaction.

A prevalent idea to solve the problems of account currency is further differentiate the types and functions of financial accounts; intensify regulation, monitor money laundering acts, and prevent risk by establishing NetsUnion or like institutions (to manage network online transaction payments), improving UnionPay (mainly for offline transactions) clearing and settlement system, and setting up bank subsidiary accounts.

However, for the "information account," the regulatory body for currency issuance and payment management does not limit its development; however, secondary-clearing activities and fund pool activities should be strictly prevented and controlled; law enforcements should be exercised to prevent the third-party or fourth-party payment service provider to become a shadow financial institution.

In actual operations, with respect to online transactions, setup of the NetsUnion payment clearing system is the first initiative to regulate the transfer activity of financial accounts for online payments so as to avoid an intermediate-state account between the financial account and the information account. For offline transactions, they completely rely on perfection of the current clearing and settlement system of UnionPay. The essential problem still lies in the definition of the information account and the information account proper.

Because the account serves the currency financial service, any class of transaction pattern accompanying the payment activity can derive a class of functional accounts; such class of functional accounts have rules limiting the account balance control right. These rules are variable and involving multiple parties; they easily circulate outside the regulatory system but are also a driving force for financial innovation. These rules also cause bottleneck for development of the account currency.

Therefore, it is urgently desired to regulate management and design of the information account, which is not under jurisdiction of the central bank, nor under the jurisdiction of other regulatory bodies. This is the core of the problem.

For example, a travel pre-paid all-purpose code (i.e., all payments for expenses in the scenic spot can be made by scanning the same code): the central bank does not care the actual transaction situations; when the user pays money to the value-storage company of the travel pre-paid all-purpose code, the money on the financial account is transferred from the user to the value-storage company; as to whether the value-storage company delivers its products (trade property, service property), the central bank does not care. For another example, Yeebao (an Alibaba money market fund): from the perspective of the central bank, the moment of transferring the money to Yeebao is equivalent to buying Tianhong funds; as to whether Tianhong delivers its products, the central bank does not care.

However, the information account managed by such commercial companies with a trade property and a service property can automate the information flow to map the actual transaction activity to Tianhong Fund's buy-in sell-out activity, which may even obtain a substantive currency issuance right by falsely increasing the balance of the information account (similar to the activity of a second central bank).

In other words, according to the informatics theory for economic trade services, the financial account and the information account cannot be severed from each other; any attempt to control and monitor circulation of account-type digital currencies based on the division of financial account from information account has serious loopholes in theory.

The time when a net-union project is invested with a large sum of funds, it digs a trap for the future; to solve more and more problems, a second, even a third net-union has to be built in the near future.

Further, the fundamental reason for many hypotheses in economics to be untenable lies in the blind belief in the basic theorem of "sum of parts equals to whole." Parts cannot be joined into a whole: the whole needs to understand the "envision of top-tier design."

The drawback of blind belief in "sum of parts equals to whole" lies in that: to find the origin of a thing, breaks the thing up to obtain its components and basic parts; the smaller the thing is divided, the more fundamental parts are obtained. However, in consideration of quantum entanglement, there needs another thinking for solving problems. The General Relativity is also an appropriate approximation theorem. Why? Because Einstein's General Relativity is a classical theorem, which is incompatible with quantum mechanics. Although the General Relativity is nice, it is only a nice classic approximation, and nobody knows from it is derived from what kind of quantum structure. It is still a biggest pending problem to find a more fundamental and nicer quantum structure which can demonstrate the General Relativity, gravity, and elementary particles. Quantum entanglement is the origin of matter and space-time. The present disclosure believes that quantum entanglement is the original of all matters (see New Revolutions of Physics); it is not unreasonable to allege that quantum entanglement is the origin of all matters. From quantum entanglement, we may derive a motion equation of matters, like Maxwell's Equation and Dirac Equation. But it is somewhat unreasonable to say that the quantum entanglement is the origin of time and space, because we cannot derive Einstein's General Relativity equation from quantum entanglement yet. The present disclosure attempts to interpret, derive, quantize, and reproduce the "origin of world" from perspective of macro world.

Although scientists have been trying to figure out the real origin of elementary particles, space-time, and the gravity, the progress is very slow in a long term. In 1989, a new matter, i.e., topological matter, was discovered in the studies on condensed matter physics. it is later realized that the topological matter is originated from quantum entanglement in a complex system. It seems that the topological matter quantum entanglement has no relation with the origin of elementary particles; but the present disclosure believes that they are completely linked. In other words, the quantum entanglement in a complex system is the origin of elementary particles, space-time, and gravity force.

However, the "turning to self" idea in life science studies is not accepted. Development of the AI robots verifies this wrong logic. Therefore, the empirical system of the entire western world has increasingly gone awry, which is still misled by the "sum of parts equals to the whole" theorem. It is not the problem of "Artificial Intelligence," but the problem of "Human Cognition," which reduces the systematic wisdom of human to the mechanism and reductionism level; the human beings constantly marches into a desperate situation: using robots to replace human, and finally extinguish human. Cliffs Notes explains the quantum mechanics as such: the scientists prove that atoms may exist simultaneously in two states, and this phenomenon is called superimposition. For example, a single atom may be simultaneously present at two positions. In a larger scale, superimposition will become even more weird. Because all matters in the world are composed of atoms; some physicists even presume that a complete matter is present in multiple dimensions, which makes a parallel world possible.

SUMMARY

An objective of the present disclosure is to provide a code-chain based model, an apparatus, a system, a method, and an application of the same, so as to solve the various problems above with a new network access mechanism.

To achieve the objective, a technical solution of the present disclosure provides a CodeChain-based service providing method:

identifying, by a terminal device of a user, a coding medium, so as to access a CodeChain server to obtain an access address of the CodeChain server;

interacting, by the terminal device, with the CodeChain server based on the access address to obtain a service object list sent thereto from the CodeChain server;

interacting, by the terminal device based on a service address included in the service object list, with the server of a service provider directed to by the service address to obtain the service provided by the service provider.

Optionally, the coding medium identified by the user with the terminal device is issued by the CodeChain server; when the service is provided by one service provider, the CodeChain server issues the coding medium after receiving the code issuance request filed by the service provider; or, when a plurality of service providers provide their respective services, the CodeChain server issues the coding mediums based on the code issuance requests filed sequentially by the plurality of service providers.

Optionally, when the CodeChain server receives the code issuance request filed by one or more service providers, the CodeChain server issues the coding medium after verifying the service provider or service providers based on the digital person identity information of respective service providers.

Optionally, the service object list includes a script indicating service sequence and parameter, a service address of one or more service providers providing services, and a dynamic digital token corresponding to the one or more service providers; and the dynamic digital token corresponding to each service provider includes a description of the scene in which the service provider provides the service and the digital person identification information of the service provider.

Optionally, in the service object list, the service address of the service provider providing the service is indicated by service sequence; the terminal device of the user integrates the parameter required by the script and the data provided based on the parameter into a service parameter which is provided to the server directed to by the service address so as to obtain the service.

Optionally, the mobile terminal of the user further obtains a dynamic digital token by identifying the coding medium, the dynamic digital token including a description of the scene in which the service provider provides the service and the digital person identification information of the service provider.

Optionally, when the terminal device of the user interacts with the CodeChain server, the CodeChain server is requested to authenticate the service provider based on the dynamic digital token which is obtained from identifying the coding medium and includes the digital person identity information of the service provider, and the CodeChain server sends a service object list to the terminal device in response to the request passing the authentication.

Optionally, when the terminal device of the user interacts with the CodeChain server, the CodeChain server is requested to authenticate the coding medium; the CodeChain server sends the service object list to the terminal device in response to the request passing authentication.

Optionally, the user provides the CodeChain server with the digital person identity information of the user when interacting with the CodeChain server via the terminal device; the user provides the server with the digital identity information of the user when interacting with the server of the service provider via the terminal device; the digital person identity information of the user corresponds to the user and/or the terminal device.

The present disclosure provides a CodeChain server, a digital person terminal device, a digital person server, and an integrated system, as used in the service providing method.

Another technical solution of the present disclosure provides a CodeChain-based interaction implementing method, wherein each digital person has identity information, the identity information corresponding to a person represented by the digital person and/or the terminal device used thereby; the method comprising: identifying, by a terminal device, a coding medium generated according to a CodeChain access protocol so as to enable the digital person to access a CodeChain network on behalf of the person; and performing data transfer with another digital person and/or system according to entrustment of the person.

Optionally, the code issuing center issues the coding medium and manages information associated with the coding medium; the digital person identifies the coding medium to obtain an access address directed to the server of the code issuing center; through interaction with the server of the code issuing center, the digital person obtains information associated with the coding medium.

Optionally, the digital person obtains a jump instruction directed to other digital person and/or system through interacting with the server of the code issuing center.

Optionally, when interacting with the server of the code issuing center, the digital person obtains, by providing the identity information of the digital person, content in conformity with the attribute of the digital person in the information associated with the coding medium;

Or, when interacting with another digital person and/or system, the digital person obtains, by providing the identity information of the digital person, content in conformity with the attribute of the digital person in the information associated with the coding medium;

Optionally, one or more digital persons as issuer file a code issuance request with the code issuing center, and the code issuing center issues the coding medium after verifying the identity of the issuer; wherein the information associated with the coding medium includes information of the issuer.

Optionally, for the digital person accessing the CodeChain network by identifying the coding medium, the code issuing center records the identity information of the digital person into the information associated with the coding medium.

Optionally, for the digital person performing data transmission, the code issuing center records the identity information of the digital person into the information associated with the coding medium;

Or, for the digital person performing data transmission, the code issuing center generates a new coding medium based on the CodeChain access protocol, wherein coded information of the new coding medium includes data to be transmitted and identity information of the digital person.

Optionally, when the digital person performs data transmission, the person represented by the digital person performs information filtering and/or provides additional information based on the information identified from the coding medium and then transmits the data out.

Optionally, the digital person has a unique identification chain, which forms a key string jointly with a key for decoding the identification chain.

The present disclosure provides a digital person terminal device, a code issuing center and an integrated system, as used in the interaction implementing method.

A further technical solution of the present disclosure is to provide a coding medium, the coding medium is applicable to any one of the above methods or systems, but not limited thereto.

Optionally, identification of the coding medium is initiated by executing at least one of the following operations:

scanning or shooting the coding medium via a camera of a digital person;

scanning or shooting the coding medium provided by the digital person via the camera of other digital person or via various other optical sensing access, including access based on quantum entanglement effect of the "quantum CodeChain"; (including, but not limited to, an access effect based on the quantum condensation, and accessing the server of code issuing center for material and quantum calculation);

manipulating, via the terminal device of the digital person, the coding medium or a hyperlink from a same source as the coding medium;

viewing by aiming the camera of the digital person to the coding medium;

wherein the camera or terminal device of the digital person is bound to the identity information of the digital person.

Optionally, the information associated with the coding medium is managed by the code issuing center issuing the coding medium; and any digital person accesses and interacts with the server of the code issuing center by identifying the coding medium;

any digital person obtains, by providing identity information of the digital person to the code issuing center, content in conformity with the attribute of the digital person in the information associated with the coding medium;

and/or, any digital person obtains, by providing identity information of another digital person to the code issuing center, information related to said another digital person.

Optionally, a drive instruction for an application is generated based on identification of the coding medium so as to cause the digital person to obtain a service; the application is installed in any one of the following apparatuses, or the drive instruction is generated by any one of the following apparatuses based on the result of identifying the coding medium:

a device comprising a camera, a wearable device in signal connection with the camera, a terminal device in signal connection with the camera or the wearable device, and a cloud background server in signal connection with the camera, or the wearable device, or the terminal device.

Optionally, the coding medium corresponds to a Special Goods-Drawing Right (SGR) which is a unit of measurement of a real right-based smart agreement.

Optionally, when the coding medium as a digital currency is accessed and used in a designated subject, its life cycle spans across the CodeChain life cycle of the subject; the subject includes a set of services provided by the issuer of the coding medium; the CodeChain life cycle starts from issuance of the coding medium by the code issuing center, ends till the service under the subject is completely provided.

Optionally, the coding medium is an optical lattice diagram visible or invisible to human eyes, in a form of one-dimensional code, two-dimensional code, or multi-dimensional code, which is also static or has light-shadow ray variation or a frequency variation; or, the coding medium is a three-dimensional stereoscopic code with a three-dimensional stereoscopic structure formed according to an encoding rule.

Another technical solution of the present disclosure lies in providing a camera, which may scan, or shoot, or view any one of the above coding mediums, and identifies the coding medium with a built-in processor of the camera or an external processor in signal connection with the camera; the camera is integrated in the wearable device or terminal device, or a standalone camera is in signal connection with the wearable device, or the terminal device, or the cloud background server.

Optionally, the wearable device is a smart glass.

Optionally, automatic identification of the coding medium is initiated by aiming the integrated camera to the coding medium to view; and information associated with the coding medium is obtained from any one of the camera, the smart glass, other wearable device, the terminal device in signal connection with the camera or the smart glass signal, and the cloud background server in signal connection with the camera, or the smart glass, or the terminal device, and is presented by the smart glass, or another wearable device, or the terminal device.

Optionally, content in conformity with the attribute of the digital person in the information associated with the coding medium is obtained based on the digital person identity information of at least of the camera, the smart glass, other wearable device, and the terminal device, and presented.

Optionally, when being presented by the smart glass, or another wearable device, or the terminal device, the information associated with the coding medium is superimposed over the information originally presented by the smart glass, or another wearable device, or the terminal device so as to be simultaneously presented.

Optionally, automatic focusing is performed by aiming the camera to the coding medium based on the sensed scene parameter or the set scene mode;

Or, the camera receives an optical signal reflected back from the coding medium and performs automatic focusing based on the measurement result of the distance between the camera and the coding medium.

Optionally, when the coding medium is a three-dimensional stereoscopic code whose surface forms a three-dimensional stereoscopic structure according to an encoding rule, the camera receives the optical signal reflected back from various parts of the three-dimensional stereoscopic structure, and implements identification of the three-dimensional code based on the measurement result of the distance difference from various parts to the camera.

Optionally, the camera of the digital person shoots a video or image with landmark information under a specific entity scene, and the code information together with the coding medium including the digital person identity information is sent to the cloud background server to bind;

Through any of the following operations, the wearable device or terminal device of the digital person or another digital person may present a virtual scene corresponding to the entity scene; wherein, preferably, the respective digital person obtains the content in conformity with the attribute of the digital person in the virtual scene by providing the digital person identity information;

the operations include:

identifying the presented or propagated coding medium;

or, identifying the coding medium based on position information in the entity scene;

or, identifying the coding medium that can be retrieved according to a condition, wherein the condition includes any one or more of the entity scenes, the landmark information, the video or image including the landmark information, and the digital person identity information of the shooter.

Hereinafter, embodiments and technical effects of the present disclosure will be illustrated with reference to the accompanying drawings.

DETAILED DESCRIPTION OF EMBODIMENTS

Figure 1:
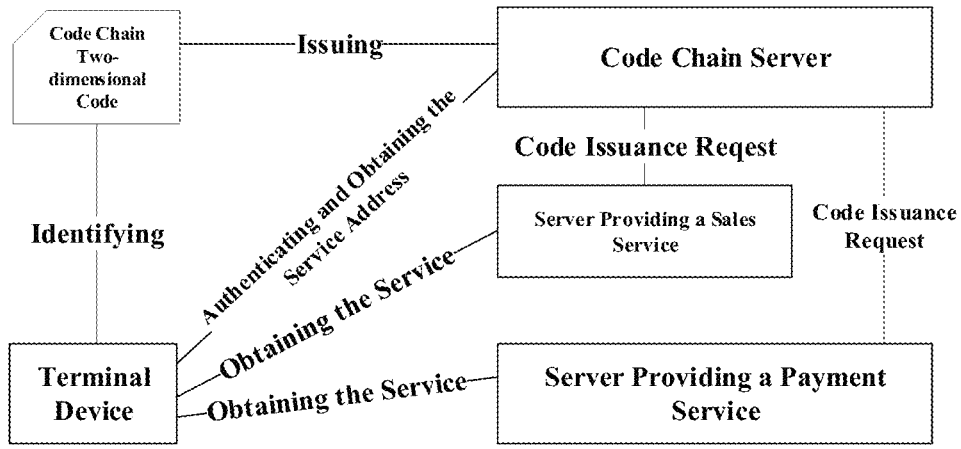
FIG. 1 shows a schematic diagram of providing a service based on CodeChain.

The present disclosure provides a CodeChain-based IoT digital person model and a method of implementing the same. The CodeChain idea is based on the concept of "digital person," which embodiments a manner of viewing and creating a world characterized by interconnection of all things and all matters and human-orientation. During the interaction of human-thing interaction, the digital person needs to transmit its own information rapidly to the system (digital person world) in a digitalized manner.

The digital person refers to a proxy network which can represent "person" (natural person, legal person, etc.) to perform data transmission in a human-machine interaction process, which conducts activities and participate in a digital person network with a subject-based digital person ID (digital person DNA) as the identity, wherein the proxy network can dynamically save basic information of the person, and transmit information to the business system under human permission and in case of need. The data of the digital person may be saved in different business systems (e.g., WeChat and Facebook); therefore, the digital person identify is implemented in a chain form, i.e., the digital person may simultaneously have "multiple subjects," so as to access the unique identity chain based on the specific subject. The identity chain of the digital person and the key for decoding the identity jointly form a key chain.

In the CodeChain network, the digital person, its activity, and goods (commodities) are integrated offline and online, i.e., each time digital person accesses the CodeChain network, which may be individually represented as two-dimensional scanning, or two-dimensional code tapping/viewing (what you see is what you get, what you see is what you think), but also may be a hyperlink expression manner with combination of "two-dimensional code and homogeneous link." The information included in the "hyperlink" is identical to the information included in the homogeneous two-dimensional code and is generated based on the same predetermined coding rule; the hyperlink further comprises a two-dimensional code, which may be sensed and accessed in the real world, but also may be accessed by tapping in a smart device, e.g., long pressing the picture of the two-dimensional code to identify the hyperlink so as to access the CodeChain network. The specific access operation is performed by a terminal device enabling digitalized sensing such as a mobile phone, a tablet computer, a smart glass, which performs information interaction with another digital person or system after accessing the CodeChain network; then, the identity information of the digitalized person may correspond to the identity information of the person and/or its smart device.

The body node linked to the CodeChain network is "digital person," rather than "IP/machine" (any machine-based consensus mechanism will bring disasters, because when one point is broken, the whole system will be paralyzed). Then, the digital person should be a server or an operation initiating terminal that is controlled by a holding person and representing part of acts of the "person."

If the digital person is only regarded as an ID or a WeChat mini-program, it is still technically inequivalent to the server end. The digital person should be characterized by: 1) may normally initiate a session; 2) may normally wait for a session request and start the session. 3) the session between digital persons may not undergo human intervention (there is not necessarily a human-machine interface, wherein the quantum effect is actually only an embodiment); a core technology specifically applied to the CodeChain digital currency is a consensus mechanism based on the "digital person"; it is further characterized as quantization, individualization, flexibility, and low-cost; the human society needs a human-based consensus mechanism.

CodeChain is a means of enhancing efficiency; while the digital person ID is only an embodiment implemented on the program, which completely adopts the approach of human-orientation, while deviating from the matter-standard (an artificial intelligence principle based on machine/IP address); as such, the digital person is defined as: all digital devices owned by the person+personal information server+ outer network access entry (in the form of subject CodeChain); therefore, its embodiment on a current physical network may be a piece of software on a home smart terminal. The server end transmits its service code based on the agreement; the digital person on the CodeChain grants access authentication and filter; the digital person accepts service information and interacts with the holding person, which represents the person holder to manage part of information for interaction, thereby alleviating human work:

The CodeChain access protocol is a bottom layer, and then various upper-layer protocols mentioned above are defined. Therefore, the technical change lies in changing the inequality between the person and the server end. The most important protocol basis is CodeChain digital currency, CodeChain evaluation, and CodeChain service interaction: constructing a human activity in a digitalized way, and reconstructing a informatized new world.

in the IoT era: it is an important task in social information architecture to construct a personal data protection system; the CodeChain idea regulates the personal data protection protocol (which may be a front-end anonymity/screen name, and the backend may be traced to the real name); using a smart home data center (digital person proxy to access the CodeChain; for an individual person, is a safer technical and engineering means than accessing the Internet directly via a personal digital device.

Currently, there are many kinds of home smart centers, for example, TV, set-on-top, smart gateway, etc.; various manufacturers provide different products. In contrast, the nodes linked to the digital person are not things such as furniture and home appliances, but also digital persons. Its value in communication and propagation constitutes the social "value" of the digital person; while the home appliances imparted with a "digital person attribute" can become one of entries for new ear CodeChain network, i.e., home smart center. The digital person does not exist alone, but is a subject-based node of a social network formed by a specific IoT space-time and thus has various attributes (the smart home is one of the personalized attributes imparted to the "digital person"), which is very similar to some important devices on the IoT. The most important thing is a smart home control center. The digital person proxy—digital person service end universal digital person session protocol.

Figure 8:
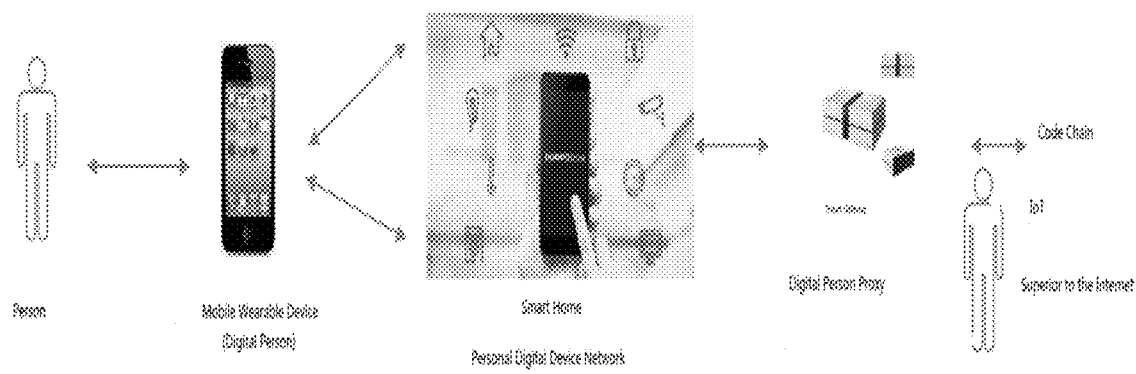
FIG. 8 shows a schematic diagram of a relationship between a digital device and a digital person in the CodeChain IoT era.

FIG. 8 shows a relationship between a digital device and a digital person in the CodeChain IoT era. The digital person may be a http proxy. Controlling personal information, and finally implementing a link network of a subject-based activity which is self-centered and an extension of the social network of human activities as the radium. A human-B/C-digital person proxy—serving end: the CodeChain enables downward accommodation; the access manner needs to change the current B-S and C-S manners, which may be decentralized or P2P; each person has a proxy in the digital world, and this proxy is a digital person.

Conceptually, the information exchange between digital persons should not be client-server, which is unequal. However, exchange should be based on equality. The CodeChain digital current is an exchange of a set of information, an information exchange between digital persons. The main form of CodeChain digital currency should not be an account hosted at the service end: the ID is the initiator of scanning access, which is a property superimposed with the DNA of circulation and propagation, and also a program body for logon and execution of the account of the digital currency. It uses the consensus mechanism relying on "digital person in the CodeChain network," not an IP-based consensus mechanism for robot groups; bitcoin fork has shocked many people in the society, because one core characteristic of the block chain is unchangeability. The hard form indicates that the block chain is not unchangeable and also reveals a more important fact:

The block chain is not a system without requirement on trust. It is true that we don't need to trust a single institution (e.g., bank); actually, we trust a third party. When you hold a cryptocurrency, you trust the miners to protect the network and confirm the transaction; you trust the developers to maintain and improve codes; and you trust the users to use the platform reasonably. You do not trust a single party, but trust the whole community. The block chain reassigns the trust from a single party to distributed more parties. The more distributed the trust is, the less the risk of fraudulence. Therefore, we should build a system with stronger trust rather than build a system without a requirement on trust. The whole system is to trust a robot group (if the bitcoin is regarded as a kingdom, supporters for different expansion solutions are different parties in the kingdom. Now, the bitcoin has two major opposite parties: Bitcoin Core, and NYA (New York Agreement Party). The former controls the codes of bitcoins and the authority in belief; the latter is the alliance of exchanges and big mine owners, wherein the NYA was established at the moment of signing the "New York Agreement" in May of this year).

The CodeChain idea may perfectly solve the problems mentioned in the background, which further proposes an IoT model that has a greater extension and is more secure and reliable. The first generation of Internet is a network connecting IP and IP with the IP address as the core; two IPs are like two hunters in a dark forest, which are anonymous and unknown to each other. The second generation of social network is established based on subject, social status, and social attitude. The CodeChain network is an upgraded "digital person" network interconnection system model proposed over the above two generations.

The CodeChain network may be regarded as a three-dimensional model expression of the first and second-generation links; compared with the point-to-point service served by a merchant system to a person in the first generation and compared with a point-to-plane forward feedback propagation based on the social network between humans in the second generation, the CodeChain model emphasizes more the human-thing connection and human-human link, thereby organically integrating online and offline, providing a more efficient, more secure, and more reliable propagation for good commercial service, and meanwhile can effectively protect personal privacy.

The two-dimensional code related to in the present disclosure refers to the CodeChain two-dimensional code based on the above CodeChain idea, wherein the code information of each CodeChain two-dimensional code includes an issuer (which must be a digital person) requesting for code issuance and a service object list. Each identification (e.g., code scanning) of the CodeChain two-dimensional code represents a connection, such that the service provided by the issuer can be connected to the scanned digital person, and the code-scanning digital person may obtain the desired service through data exchanged between digital persons.

The service that is available to all digital persons and all object digital persons obtaining each service constitute a "human-service connection matrix," which is referred to as Matrixlink. The CodeChain not only records all historical links, but also records potential links based on each digital person's intention (a wave function based on social status and social attitude. Actual occurrence of the wave function is referred to as collapse), thereby preventing occurrence of the link (i.e., act) in conformity with the digital person's intention, and digging out the potentially desired service of the person.

The digital person is defined as such: the digital person is a set of proxy services granted to a specific person in the CodeChain network, which has an attribute of a specific subject-based social attitude initiated in the 5W time-space with the social network as the radium, which usually accesses a "service" by scanning a two-dimensional code, clicking the Moments, and viewing the glass; and in the future, it is an "Tangled Angel Brain" accessed via "quantum CodeChain." Function: recording, providing, and protecting personal data of a person according to the person's need; executing the automated flow required when receiving the network service; executing the desired automatic data analysis and automatic feedback flow; sorting and saving activity data of the person; reporting the activity data of the desired person to the Tangled Angel Brain, and providing data and computing services according to the requirement of the Tangled Angel Brain.

Open Payment Framework (CodeChain digital currency payment system) is defined as a set of CodeChain digital currency-based payment services provided by the CodeChain cloud platform. Function: providing automatic services such as authentication, anti-counterfeiting, anti-repetition, and transaction records for the service provider in the CodeChain network when the served person pays a digital currency. Notes: during the secondary development process in which the service provider provides services, the open payment framework may play an important role of regulating the uniform payment flow and accelerating the payment program development efficiency and is thus a most fundamental service function of the CodeChain cloud platform. Meanwhile, the open payment framework is a standard cashing tool between the CodeChain digital currency and the traditional flat money/Central Bank Digital Currency.

Definition of the CodeChain Digital Currency: the CodeChain digital currency refers to a kind of specific information transmitted in the CodeChain network, such information representing consideration information paid by the served person to the service provider. Function: reflecting the contribution and value of the service provided by the service provider. Adapted for "Digital Person Network." Notes: the CodeChain digital currency is a piece of specific attribute information of each completed transaction in the CodeChain network; in the CodeChain technology, the completed transaction object is untampered, which is guaranteed by a notary service provided by the digital person in the CodeChain, and is thus different from the account currency, which is a pure digital currency.

Figure 9:
FIG. 9 shows a structural diagram of "code-scanning payment" based on account management.

The idea of the CodeChain fundamentally solves the problem in information account. FIG. 9 shows a structural diagram of "code-scanning payment" based on account management. The money is circulated to the merchant's account from the personal account in the third-party payment service provider; in actual operations, there are different manners: scanning, scanned, and simple transfer, but their general flow is the framework shown in FIG. 9.

It is seen that this payment circulation process works based on the credit of the user and the merchant in the third-party payment account; therefore, the third-party payment functions to guarantee the fund security of the user and the merchant. However, based on the business logic and business interest, the third-party payment will inevitably make profits utilizing the trust of the user and merchant and the stored user data, comprising:

1) disclosing and selling user payment data;
2) assisting fraudulent merchants for money laundering and making illegal profits;
3) under the disguise of wealth management, luring users and merchants to purchase a financial product tied with the third-party payment;
4) negligence in risk prevention, causing the user data exposed to an insecure Internet environment, but shift the blame to the users and merchants. Therefore, with respect to the account currency, the third-party payment is technically in a central position, and all information is grasped by the third-party payment service provider. Therefore, the technical incompleteness of the account currency brings a huge security risk to population and promotion of the code-scanning payment.

Figure 10:
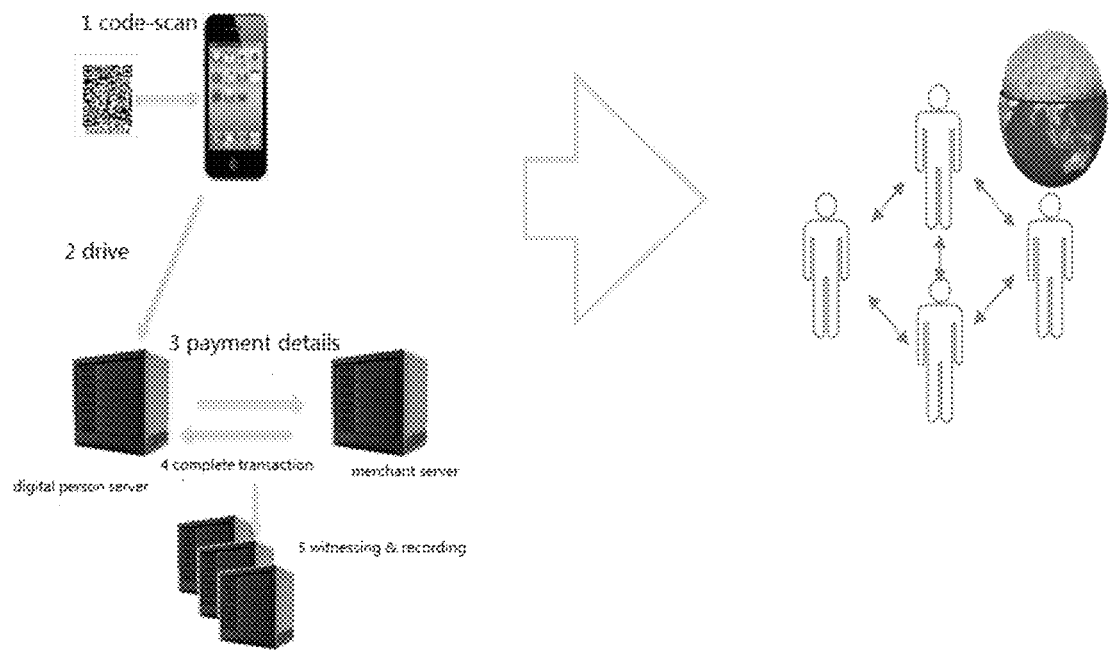
FIG. 10 shows a payment flow diagram under the idea of CodeChain.

FIG. 10 shows a payment flow diagram under the idea of CodeChain. Money refers to information passed by the digital person to the merchant, which is in a form of pure digital currency. In the CodeChain digital currency system, the payer and the payee have an equal position, and the transaction between them is witnesses and recommended by digital persons on the CodeChain. The recommending digital person will receive a reward to promote establishment and extension of the system.

it is common for the CodeChain and the block chain that in the primary payment scene, the decentralized system guarantees the information equality between various parties of the transaction. The difference between the CodeChain and the block chain lies in: 1) use of scope: the CodeChain is all based on business subject, such that the use scope is limited and the use time is limited. 2) authentication mechanism: the CodeChain uses the digital person for authentication, while the block chain uses a cryptographic algorithm for authentication, such that the CodeChain efficiency is greatly enhanced, while its cost is significantly lowered. 3) the CodeChain is controllable as a whole, i.e., the total amount and use scope of the digital currency in the CodeChain subject may both be controlled by a special institution (digital bank).

Figure 11:
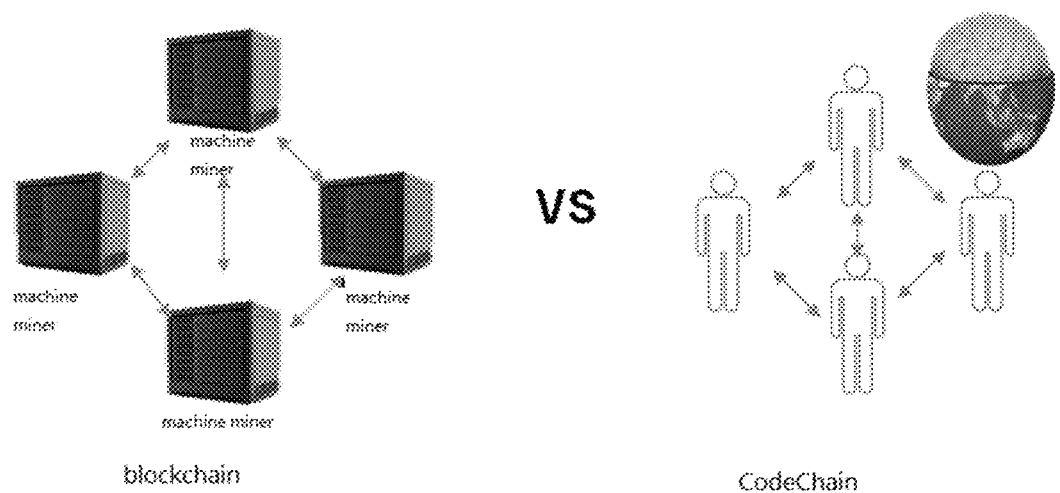
FIG. 11 shows a schematic diagram of comparison between block chain and CodeChain.

FIG. 11 shows the technical innovations of the CodeChain authentication: the CodeChain is a technology of establishing a distributed ledger using the trust (based on the digital person network system) relationship (forming a CodeChain network) in the human-to-human network, which is more flexible than the machine trust (e.g., the IP address group based on the block chain, in contrast to the human society and the silicon-based civilization which is approaching to insulation); besides, it also has a low-cost feature; additionally, it further defines information security.

transactions of the traditional e-commerce:
1) the transaction data are scattered in the agency and the service provider;
2) information inequality: the agency has the consumption information of the consumer. The service provider owns consumption information of all consumers.
3) no information verification.

transactions of CodeChain:
1) the transaction data is in the CodeChain, and the CodeChain constitutes a decentralized ledger.
2) transaction verification: in the CodeChain, the participator verifies the transaction and jointly sets up a general ledger.
3) information security: non-participant of the transaction other than the regulatory body has no rights to obtain information.

in the IoT era: it is an important task in social information architecture to construct a personal data protection system; the CodeChain idea regulates the personal data protection protocol; using a smart home data center (digital person proxy to access the CodeChain; for an individual person, is a safer technical and engineering means than accessing the Internet directly via a personal digital device.

The CodeChain focuses on an economic subject (trade) rather than money (finance); in the CodeChain, delivery of the digital currency and delivery of the service are equal; in the CodeChain, digital persons are independent and counterpart entities; a variety of changing transaction flows may be constructed, without a need of specifically defining an information account to manage money.

Therefore, a "human-centered" (digital person) ecological system is constructed; while multiple subjects form a human society (mapping of digitalized human activities). Any transaction in the CodeChain has records and can be traced back, thereby avoiding the circumstance in which money transaction is not in conformity with the actual transaction. Therefore, the design problem of the information account is fundamentally solved, which avoids risks brought by free opening of the information account while maintaining innovative impetus in payment, finance, and entity business.

Therefore, substantively: 1) the CodeChain does not change the design and implementation of current financial accounts, which only regulates the information interaction, verification, and recording process of the real subject economic activity at the end transaction. 2) the CodeChain digital currency is a development, not an overturn, of the central bank digital currency, so as to adapt to the ever-changing transaction and financial innovation brought by development of the information technology and IoT in practice. 3) From the development of the CodeChain digital currency on the end application, promotion and development of the traditional account digital currency in the Belt and Road may be retrodicted, thereby gradually replacing the ruling position of settlement with traditional account currencies.

Technically, the core regulatory system of the CodeChain digital currency issues codes uniformly, verify the CodeChain uniformly, and records the CodeChain uniformly, thereby implementing its confidentiality and authority; the technical support architecture adapted to large-scale end application is its critical technical element.

Definition of "Circulation Propagation of Surplus Value Network": under the precondition of "CodeChain" access, with a specific 5W (i.e., IoT space-time) as the starting point, implementing CodeChain full-channel (offline-online integrated link) access based on a specific subject (advertising of a specific product or activity). It not only forms a traceable "source two-dimensional code" (the access grid of the IoT world), but also generates and superimposes "a new two-dimensional code and/or hyperlink of the accessing digital person" over the original two-dimensional code through the "two-dimensional code scan" and "Moment tapping" of the social network, thereby constructing a new "digital person network" system, such that "the contribution degree of each link of circulation propagation" can be quantized and tracked, thereby implementing "capitalization of the advertisement investment, valuation of circulation propagation."

In the human society, "value" is created from "access" and "propagation" based on the "All for one and one for all" value system, i.e., the definition of value in the Das Kapital focus on "production phase: indiscriminate human labor condensed in production/product," the unit of measurement of which is "currency"; while the circulation and propagation of "surplus value" is to "discover the origin of the true, the good, and the beautiful, and propagate formation of the value chain" such that a "value system" specific to the "human society" is formed based on the quantized value of "love" in the "human society," the unit of measurement of which is a form of "CodeChain digital currency," which is different from the bitcoin that is a "value system" formed based on the "calculation time of computer CPU/GPU" (rules of a robot world), but a formation of "value system" of human society; it answers the question of the significance of human labor (under the big background that physical labor is replaced by robots, and mental labor is replaced by AI), human survival/value creation, which may refer to relevant description regarding the quantum CodeChain digital currency.

An application of the CodeChain mainly involves tracking and tracing the advertisement code, wherein the CodeChain accesses the digital person. Newspaper media may become a traceable "digital person network" access node by "releasing CodeChain two-dimensional code news" on various paper media, online, and TV to gain political and economic effect. The digital person management may propagate in a human way by "two-dimensional scan, Moment forward," such that the netizens can access "the digital person network." In this example, the news media release field and social media propagation field are linked by the CodeChain; the media plans "IoT" access, releases and tracks the subject and provides an "authoritative certification system"; the online social digital person propagation constructs a brand-new system for "CodeChain" new marketing network, and circulates and propagates the surplus value system.

FIG. 1 shows an exemplary interaction process based on the CodeChain two-dimensional code. A digital person 1 provides a sales service and entrusts a digital person 2 to provide a payment service; the servers of the digital person 1 and the digital person 2 sequentially files a request for issuing a service-specific two-dimensional code to a CodeChain server; the CodeChain server implements a uniform CodeChain verification: issuing a service-providing two-dimensional code after verifying the real identities of the digital person 1 and the digital person 2. A digital person 2 as a customer views the service entity or advertisement and scans the two-dimensional code via a smart terminal, thereby obtaining the service in a smart way: it first authenticates, from the CodeChain server, whether the two-dimensional code is real upon obtaining the service; then the smart terminal device obtains an instruction from the CodeChain server (including an instruction of being redirected to a designated page to insert parameters), thereby obtaining the service from the server which actually provides the service. The same CodeChain two-dimensional code enables the smart terminal device to interact with the server of the digital person 1 to obtain a sales service and interact with the server of the digital person 2 to obtain a payment service, respectively, when proceeding to different interaction phases of obtaining the service based on the service object list included in its code information.

The CodeChain two-dimensional code and relevant data structure are distinguished from other http address jumping manner provided in an insecure two-dimensional scan. Besides providing the CodeChain server address, the CodeChain two-dimensional code of the present disclosure further provides a dynamic digital token provided according to an issuance request of the service issuer (e.g., digital person 1 or 2), wherein the token indicates the scene description where the service issuer can provide services, as well as the service issuer per se. After completing the scan, the smart terminal device requests the CodeChain server to authenticate the service issuer with the digital person identification symbol of the served person (e.g., digital person 3) as the parameter or part of the parameter according to the CodeChain server address indicated in the two-dimensional code and the dynamic digital token; if the CodeChain server passes the authentication, the service object list is returned; meanwhile, the matter requested by the served person are recorded in the CodeChain (also referred to as the uniform CodeChain record).

A data structure of the service object list is provided below:

| | |
|---|---|
| Script indicating service sequence and parameter; | Service address 1, dynamic digital token1<br>Service address 2, dynamic digital token1 |

The smart device reads out the data corresponding to the required parameters from the data of the digital person 3 based on the data structure according to the parameter required by the Script, assembles the data into a service parameter, and transmits the service parameter to the server indicated by the service address, thereby obtaining the service. For scenarios with more service issuers, the same principle may apply.

A camera with a built-in processor can automatically implement shooting and identifying of the CodeChain two-dimensional code, and can automatically generate an association with the corresponding application or target service through a uniform IoT protocol (e.g., CodeChain access protocol) based on the identification result, thereby providing an additional function to the application. The whole process may be automatically completed without human involvement, convenient and reliable to use. In some other examples, the data processing required in the identifying or accessing process may also be implemented by a processor external to the camera, e.g., configuring the process at the smart mobile device and the background server, which have data interaction with the camera. The camera may be provided separately or integrated with the smart mobile device. The smart terminal device may further comprise an information transmitting/receiving unit which performs information interaction with the CodeChain server or the server of the service issuer, an input unit for human-machine interaction, and a display unit, etc., which are not enumerated here.

CodeChain-Based Payment Service Application

Traditionally, the payment service refers to providing clients with collection and payment services for transaction-specific money. In China, the traditional payment service requires a payment license; in the electronic payment era, because collection and payment can already be implemented in real-time over the network, a so-called fourth-party integrated payment (i.e., the information service in the payment field) emerges. The fourth-party integrated payment does not involve control of money, just practice information transmission services between the client and the financial institution, which can provide more satisfactory and elaborate services to the clients while avoiding the qualification issue. The CodeChain technology may provide a most effective technical warranty for the payment service.

The electronic virtual asset (asset digitalization) is a new thing. Because it may be used as currency in actual user, the electronic virtual asset is always confused with the currency, thereby generating some wrong concepts and ideas. The most typical electronic virtual asset is the single-purpose prepaid card. In order to reduce the operation cost, particularly the capital cost pressure, the merchant adopts a way of collecting pre-payment from the customers, i.e., first collecting cashes from customers and then delivering services based on customer demands. When the merchant collects pre-payment from the customers, it actually sells a customer service contract, which capitalizes this contract, such that the contract may be regarded as an electronic virtual asset. Supposing that the unit of the single-purpose pre-paid card is "point," the customer returns the number of points of the contract to the service provider while delivering the service.

Typical use flow of the single-purpose pre-paid card: first, the customer purchases the pre-paid card to obtain a number of points, and the regulatory institution extracts 20%-40% of the cash for preventing the merchant from evading fulfillment of the service contract; second, the merchant extracts the cash for improving services and stocking etc., which first pays costs; third, the customer comes to the merchant to consume and pays with a number of points, wherein the merchant delivers the service and determines its sales amount.

In the flow above, the first step is a payment process, wherein the customer pays money to obtain an electronic contract. The second step also involves payment; the merchant pays the money for improving services to its service provider. The third step is a bartering process, wherein the service is exchanged with an electronic contract; besides, it is also a process like payment.

Hereinafter, some variations in the flow are further analyzed. If the customer does not want the services after buying the pre-paid card, a traditional approach is that the customer has to go to the merchant for refund; in this case, because the merchant has paid the cost, this refunding activity would cause business difficulties to the merchant, thereby affecting services delivered to other customers. Therefore, an exchange service is designed. In other words, the customer does not pursue refund from the merchant, but sells the electronic contract of merchant A on the market to exchange for an electronic contact of his need, e.g., Merchant B's electronic contract. A typical example is Points Mall. Because the electronic contract has a price, this process also involves payment or quasi-payment.

CodeChain digital capitalization of a consumption smart contract includes the following contents:

1) using the "smart contract" to lock down a real right, wherein the unit of "measurement" of the contract is an individual "CodeChain two-dimensional code/CodeChain digital currency," i.e., a smart contract based on control of real right, simply referred to as a "special goods_drawing right" ("SGR"); each code may have another unit of "price."

A preferred example is that relevant information of the CodeChain two-dimensional code and its changes are all recorded and managed by a uniform institution. Based on different coding rule settings, relevant information of the CodeChain two-dimensional code may be directly obtained by identifying the CodeChain two dimensional code, or what is identified is the jump address directed to the server of the CodeChain management institution, and then the relevant information of the CodeChain two-dimensional code may be obtained via interaction with the server (some examples of the relevant information will be provided infra).

2) "one-time subscription" of the CodeChain two-dimensional code corresponding to the SGR is made over the "CodeChain digital person platform" of the issuer, which is similar to the primary market of stock issuance. The CodeChain management institution binds the CodeChain two-dimensional code with the digital person ID of the subscriber and records relevant subscription information.

3) during the issuing process, the "consumers with cultural innovation" may be discovered and encouraged through the CodeChain two-dimensional code recording and propagation chain to superimpose an additional value over the smart contract, thereby imparting a humane additional value to the SGR; the additional information (e.g., comments, recommendations, etc.) provided by the propagator for the CodeChain two-dimensional code and its corresponding SGR and/or the digital person ID of the propagator may be superimposed over the CodeChain two-dimensional code.

4) the one-time issued CodeChain two-dimensional code (the SGR of the smart contract has been bound to the digital person ID account) may be listed in the "secondary market, i.e., digital asset exchange," which is a matching trade mode to obtain liquidity premiums; for example, by seeking confirmation from various parties (exchange, transaction parties, bank, etc.), a CodeChain two-dimensional code that has a successful transaction history between digital persons is confirmed, and the CodeChain management institution will accordingly adjust the binding information between the CodeChain two-dimensional code and the new digital person ID and record corresponding transaction information.

5) for the actual consumption, two-dimensional code ordering and two-dimensional code write-off (offline code scan payment is equivalent to completing one time of smart contract consumption, providing the agreed goods or services, i.e., write-off) may be completed via the CodeChain two-dimensional code payment system, such that the operation cost is effectively reduced via the CodeChain integral information technical means. If it has been confirmed to various parties that the CodeChain two-dimensional code has been written off, the CodeChain management institution will record it.

6) further, when the CodeChain two-dimensional code corresponding to this "special goods_drawing right" enables consumption transaction in more CodeChain franchisers, it may be used as a universal "CodeChain digital currency."

7) the CodeChain digital currency may be cashed at a digital currency bank (digital bank) into a designated other currency, point, bitcoin, etc. (the exchange rate can be fixed or floating, or may refer to a package of exchange rates of the market prices of different "CodeChain digital person server").

8) the agency for insurance payout (bound to each SGR) when the smart contract cannot be performed is referred to as a "digital insurance company."

Through the above analysis, it may be seen that a payment and quasi-payment process more complex than the payment activity for a common service transaction is present in the actual service process with electronic virtual assets. The CodeChain is the optimal technical means for uniformly implementing this process (i.e., integrating finance and entity transaction).

First, the CodeChain-based payment service is a comprehensive upgrade version of the fourth-party integrated payment, a most important feature of which is serving as an information intermediate for the quasi-payment process of bartering between the electronic contract and the service, in addition to serving as an information intermediate during the actual payment process. A second important feature is uniform bookkeeping for the payment and quasi-payment process, which avoids the information island caused by different exchange channels or payment channels. A third important feature is uniformly using the digital person technology, which can guarantee information security during the payment and quasi-payment process (including, solving the problems of forging a collector, embezzling personal profiles of the payer, forging and tampering during data transmission, etc.).

Figure 2:
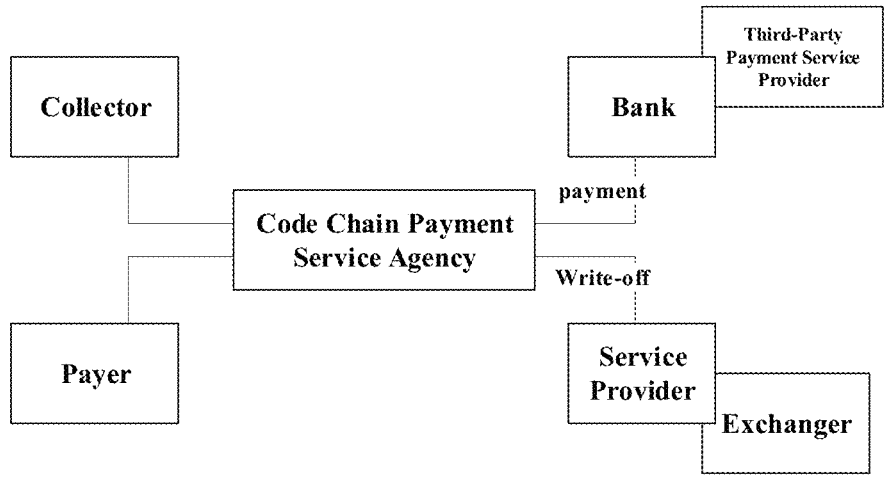
FIG. 2 shows a schematic diagram of implementing write-off via a fourth-party based on CodeChain.

FIG. 2 provides a short overview of an example of CodeChain-based payment service. Both the collector and the payer are digital persons; the CodeChain payment service institution serves as the fourth party to receive a request from the collector to ask a specific payer to pay and notify the bank; the bank confirms payment from the payer and transfers the money from the payer's account to the collector's account, and then notify the successful payment to the CodeChain payment service; the CodeChain payment service institution makes records and notifies the successful payment to the collector. Various kinds of specific information related to the payment, such as the payer information, payee information, amount, jump address of the server such as the bank, notifications, etc., may be obtained from the CodeChain payment institution after accessing based on the uniform CodeChain protocol (e.g., superimposing information such as the DNAs of respective digital persons by identifying the code-chain two-dimensional code). The CodeChain payment service of the present disclosure adds the quasi-payment process of electronic asset write-off, such that the convenience and safety in customer use and reliability of government regulation are greatly guaranteed.

Products of CodeChain Payment Service:

A. basic payment products: based on the characteristics of the code-chain technology, basic code-scan payment products may be divided into four types according to the characteristics of code-scan payment and the user scenarios: code-scanning payment, code-scanned payment, code-scanned write-off, and code-scanned write-off. For examples, the four codes correspond to the following four products. The code-scanning party identifies the code to access; and the code-scanned party presents the code for the counterpart party to identify.

B. combined payment product: to facilitate the clients to use, the payment and write-off are combined, i.e., a combination of write-off and payment is completed in one transaction. The product only supports code-scanning.

C. directional payment product: to support the merchant in using pre-collected fund and guarantees that the merchant uses the fund in a reasonable and legal way, the payment service provides a payment product of directional transfer.

Besides, to enable the customer to use the aggregated electronic contract products to the utmost extent, the payment service supports an electronic contract bi-directional transfer product.

An advantage of the CodeChain payment service includes a solid security based on the CodeChain technology. The mainstream code-scan payment product in the market is based on a static two-dimensional code, so it is hard to determine whether the two-dimensional code issuer is true, whether the payee is reliable, and whether the personal payment information would be embezzled, etc.

In this aspect, the CodeChain technology has the following features:

1. Dynamic Two-Dimensional Code Encoding:

The CodeChain server unitarily manages the scanned object The two-dimensional code does not store the actual payment address; the smart device of the payer will obtain the service address of the actual payment service provider from the CodeChain server, thereby preventing serious security issues such as virus/embezzlement of payment code brought by illegal link, etc. If the device presenting the two-dimensional code is a smart device, the CodeChain server will regularly update the two-dimensional code so as to handle the issue of forging a payment scene by counterfeiting the two-dimensional code; it may also "limit" the use scene by defining one or more of 5W (Who Says What In Which Channel To Whom With What Effect) in the IoT space-time in the code-chain two-dimensional code.

2. Transmit Sensitive Personal Information Via Digital Person Network

The third-party payment and the banking system are monitored by the central bank, which are believed technically secure. However, in the traditional two-dimensional code payment scene, the payer's bank account number, identity information, and even sensitive information including the payment password are all transmitted via the payment network, and the merchant and the fourth-party payment in the network will obtain such information, thereby bringing a great risk to the customers. This problem can be perfectly solved by the CodeChain payment service; the CodeChain payment service does not decode personal sensitive information, but first encrypts the sensitive personal identity information underlying the digital person and then directly routes the encrypted information to the bank, thereby effectively preventing the risk of personal information leakage.

Or, with "CodeChain" access at each smart terminal, a new two-dimensional code "CodeChain" superimposed with "digital person information and containing various attributes" is newly generated to as to implement, "in the subject-based digital person network," a "specific subject-based all-network consensus" mechanism similar to the block chain so as to verify the identity of the accessing digital person and "value use."

It is thus distinguished from the block chain which is a machine-based consensus mechanism bringing disasters:

when one point is broken, the whole system will be paralyzed. The consensus of human society should be a consensus mechanism based on the human beings per se, rather than machines based on IP addresses. CodeChain is means of efficiency enhancement, while the core technology of the CodeChain digital currency is a digital person-based consensus mechanism, characterized by quantization, personalization, flexibility, and low cost.

3. Digital Person Activity Monitoring:

The CodeChain payment service enables uniform bookkeeping and uniform code issuing. To tackle the activities of forging a digital person identity to practice illegal transaction and money laundering, the CodeChain payment service can effectively distinguish conformity activities and non-conformity activities based on digital person activity records and activity analysis; for those non-conformity activities, measures including suspending transaction are taken according to merchant demand so as to reduce further damages.

Contrasts Between CodeChain-Built Network and Bitcoin Block Chain:

Due to capacity ceiling and operation speed limit, an ideal application of bitcoin is to be reduced to a clearing system: "the block chain" can only be used for clearing and settlement. Invention of the bitcoin block chain changes the definition of enterprise; the block chain eliminates various frictions, which boosts some non-leader mode enterprises; the mission statement of the company may be encoded to the block chain, such that the company may operate in a complete autonomous manner. Such distributed autonomous corporations (DACs) will create a new economic entity in a Robocorps form, which will slowly infiltrate into our economy and society. However, the ending of this solution will return to the old multi-centered path. As such, the upper limit of the block chain value is Swift network: Internet becomes unnecessary for clearing and settlement.

In this way, the block chain-based bitcoin becomes one of the underlying support technologies, which has nothing to do with "social, commodity transaction, and digital currency"; cross-border settlement is required to follow the consensus of the United Nations or the great powers in Belt & Road, instead of the contribution of one machine, one ticket, or one person one ticket. Therefore, it may be believed that design of the bitcoin is detached from the basic attributes of human society, not human-centered. The attempt of the bitcoin design to record the transactions of the whole society into one general ledger can hardly be fulfilled.

The distributed ledger proposed by the block chain technology is the first technical solution proposed in the era of Share Economy, which can effectively solve the problems of information monopoly and information tampering, which has been accoladed by the information technology sector since its emergence. However, the bot coin technology has major deficiencies, such as: 1) wasting high cost—large computation capacity in meaningless cryptographic algorithm, significantly increasing social costs. 2) anonymity—the user, the service provider and the miner are all anonymous; it is possible that an anonymous user can practice illegal activities such as money laundering through this system.

The "CodeChain" technology and the CodeChain access protocol label the "real world" and the virtual world "on the Internet" as "object" with the CodeChain two-dimensional code, and superimpose the attribute and DNA of the CodeChain digital person over the CodeChain two-dimensional code, thereby building a network implemented based on the CodeChain technology over the IP Internet virtual world and the real world IoT; this network may record (not purely transactions) of all human beings in a general ledger, which uses a "CodeChain access protocol" to implement "two-dimensional code scan O2O offline scene access" and "WeChat tap SNS-based propagation chain activity." In applications such as electronic payment and digital currency in the business field, the present disclosure provides a mobile business security policy, which offers flow convenience, identity authentication capability, anti-repudiation for transactions, communication security, information privacy, service availability, data integrity, and data confidentiality.

The CodeChain technology effectively solves the core problem of the block chain technology over all advantages of the block chain technology; therefore, it is referred to as an upgrade version of the block chain technology. The information entity in the CodeChain is a digital person, which is more flexible and cost-effective than a mining machine which consumes a considerable amount of power resources. The digital person has a global uniqueness property (the same digital person may have different digital person IDs based on different subjects, thereby offering traceability between different subjects), which facilitates general ledger verification. The subject-based CodeChain has a shorter life cycle (different from the life cycle of the block chain bitcoin, the starting point of the life cycle of the CodeChain digital currency is when the digital bank issues as agreed according to rules, and the ending point of which is when the digital bank cashes and trades as agreed. The digital bank needs to guarantee that the digital currency circulated in the subject CodeChain is anchored, and the anchor issued thereby is the legal tender such as Renminbi, or service provided by the service provider in the CodeChain, or other commodity or service with a counterpart transaction capability (the typical representation of which is "Special Goods_Drawing Right"); its functions in the CodeChain include: accepting a "request" from "a CodeChain subject server" to issue a check (voucher, Special Goods_Drawing Right, etc.), offer guarantee for issuance of digital currency, exchange and cash the digital currency (Special Goods_Drawing Right), thereby implementing that the completeness of the CodeChain is guaranteed by the digital bank.

In this way, the cost dilemma caused by constant increasing general ledger and data volume of the general ledger can be effectively avoided. The information propagation efficiency is different from the mining incentives of the block chain, wherein the CodeChain applies propagation incentive. The digital currency as incentives is not bitcoin coming out of nothing, but an anchored digital currency, which is a reward based on the "circulation propagation value system," and is thus more convenient for regulation, avoiding occurrence of money laundering and Ponzi Scheme; the block chain is based on the RSA cryptographic algorithm, while the CodeChain may be based on quantum cryptography, which is thus more secure and efficient.

The code issuing center has a unique position in operations of the CodeChain system: 1) issuing service two-dimensional codes. 2) verifying service two-dimensional codes. 3) recording CodeChains, and providing authoritative CodeChain transaction records and transaction authentication records. The code issuing center offers important functions such as authenticating legal identity of digital persons, providing a legal authentication on the CodeChain, and providing the integrity and fairness of CodeChain records. The CodeChain technology effectively solves the difficulties in regulation, particularly in the context of high-speed development of the Internet banking and hysteresis of the regulation system.

The CodeChain is the most active elementary economic unit; the equality between digital persons guarantees the equal positions of various economic entities in the basic economic activities, but also offers an absolute service flexibility, which may handle various services. The technical innovations of the CodeChain lie in that: the code issuing center is under the regulation of relevant authorities, which guarantees that the real-name requirement in the Internet (CodeChain IoT economic activities, the counterfeiting technology of codes, verification, and authoritative records may effect prevent illegal activities such as faking in the information field. The digital bank is also under the regulation of the central bank, which guarantees the legality of the financial service in the Internet transaction environment to prevent financial risks.

For example, a smart travel pre-paid code: the traditional mode of pre-paid consumption in the travel activity has the following defects: 1) fund supervision issue; 2) limited use scope; 3) balance return difficulty; 4) restriction for cross-territory use.

The CodeChain mode may effectively solve the above issues: 1) the digital bank is liable for fund supervision; 2) with the CodeChain access protocol, any unit and individual may develop a service paid by the travel code; 3) the automatic exchange service provided by the digital bank enables universality of the pre-paid voucher issued in various territories; 4) the user may obtain more travel opportunities through its service to other persons.

For another example, the supply-demand of the seafood fresh cold-chain in the traditional direct-marketing/pyramid scheme faces the following challengers: 1) the member fees of the traditional member-recruiting scheme cannot be eradicated; 2) the seafood warranty period and quality tracking rely on another system. The CodeChain scheme may solve the above problems: 1) quality tracking and transaction are performed on one system. 2) the pay-but-no-delivery issue can be technically prevented, which may effectively avoid the activity of illegal pyramid scheme such as signing people up. 3) the value of propagation chain can be reflected: a digital person propagating product value may obtain a consumption voucher (surplus value based on circulation and propagation) to gain income from his contribution.

The CodeChain is further applied to the "CodeChain digital asset exchange" and the "special goods_drawing right." In contrast to the traditional block chain digital currency, the "CodeChain digital asset" refers to "a tradable digital asset" for "real right exchange" within the "CodeChain" union, wherein based on real-right control, the digital asset exchange converts a product chain agreement into a severable, tradable, transferrable, exchangeable, and trackable smart contract according to the "CodeChain agreement" with the CodeChain "smart two-dimensional code" as the medium (which differs from securitization of reits (real estate investment trust) in that the CodeChain digital asset corresponds to the "thing" in the real economy that may be finally consumed, rather than financial "virtual bubbles").

The CodeChain digital asset may innovatively drive the consumer order reversely to work divisions in respective nodes of the value Internet till the distribution principle of the smart contracts tracing and locking down the production elements is clearly presented. Each actual consumer may not only lock down the consumption, but also may participate in investment premium and share value; thus, the CodeChain digital asset is a real embodiment of share economy. The CodeChain digital exchange comprises four systems: asset filing, review and documenting, credibility tracing, transaction exchange, the unit of bookkeeping of which is "Special Goods_Drawing Right" (SGR). It is a "unit of bookkeeping of CodeChain digital asset" created by the CodeChain digital asset exchange, which is available for members to balance regular trade settlement within the systems based on the asset digitalization of various "eligible enterprises/regions/countries." When a contracted member of the CodeChain union has an unfavorable balance of regular trade, it may exchange the SGR for other digital assets with other members in the system to settle the unfavorable balance or pay off the loans from the digital settlement bank; the SGR may also serve as international reservation like gold and freely exchanged currencies; however, because the SGR is not only a unit of bookkeeping, but also serves as a real payment means; its use must rely on the code-scan payment with the CodeChain two-dimensional code so as to be directly used for trade or non-trade payment. The constant value of "SGR" is linked with a package of "goods," but its market value is not fixed. Members of the CodeChain union may obtain any goods in the reservation package with the SGR to satisfy the rights of international balance of payment in regular trade.

Therefore, the "CodeChain" may implement a sustainable development of information society credit system and promote interconnectivity of the global value Internet; on this basis, the CodeChain helps the union of developing countries to exploit their abundant resources and unleash their potentials so as to solve their long-term problems such as insufficient payment capacity with respect to foreign exchange reserves in international trade, difficulty in financing for government PPP projects and cross-border settlement; therefore, the CodeChain can enhance the capacity of the union of developing countries in foreign payment, stabilize the exchange rates of their domestic currencies, and promote their foreign financing.

The CodeChain may promote capital liquidity of global resources, perform effective configuration of resources, and unleash surplus productivity, so as to enable each individual person in each union, particularly the union of developing countries, to share the value dividends of globalized industrial chain work divisions, thereby avoiding becoming a victim of globalization.

The CodeChain union is a union of various entities which set up individual "CodeChain cloud server" based on different subjects to follow the same CodeChain access protocol and uniformly access the "code issuing center"; the CodeChain digital currency is a unit of measurement circulating between different subject servers; meanwhile, the subject servers are linked to the digital asset exchange via the code issuing center, such that the CodeChain digital currencies may cash "SGR" within the "CodeChain digital asset exchange" according to "a fixed exchange rate or a floating exchange rate" to thereby implement interconnectivity inside the union.

Traditional banks may be modified to become "digital currency SGR settlement banks: CodeChain digital banks." CodeChain digital currency and code issuing center (i.e., the function of uniform "code-scanning payment settlement center": a variety of business models may be derived from "CodeChain"; the CodeChain may free the impoverished countries from "foreign exchange reservations." the CodeChain digital currency "SGR" (Special Goods_Drawing Right, a "unit of bookkeeping of CodeChain digital asset" created by the CodeChain digital asset exchange) which is the most original "super digital asset" established based on "bartering with equal value," may not only surpass "bitcoin," but also exert the great advantage of the productivity output of various production countries in the sectors like "Belt & Road" to promote globalization of "digital currency" with real assets as unit of basic measurement, thereby implementing equality and fairness.

By building "a code-scan payment settlement center" and a uniform "code issuing center" under the framework of the Union of Nations, the "structured big data" may be controlled and "human-made financial risks" may be avoided because the CodeChain-based code scan is monitorable in the whole process (which may be uniformed to the CodeChain code issuance management center, i.e., the code issuing center).

The "digital currency" generated based on the "surplus value in the circulation domain" and the ways to handle and break the "monopoly position of printing notes" will be illustrated so as to implement globalization of the "national treasure and citizen wealth under the framework of the UN, which are measured with real assets."

Currency is originated from simple, individual, and ad hoc bartering. With development of productivity and expansion of commodity production, an augmented value form forms gradually. When a commodity specifically acting as an equivalent for any commodities is split from the commodity world, a universal value form emerges.

However, further development of productivity and further expansion of commodity exchange scope require that a universal equivalent should be fixed on a special form of commodity; then currency emerges. However, irrespective of value form, the value of a commodity has to be embodied on another real commodity. However, with advance of human civilization, particularly with popularity of the mobile terminal, in the era when a "mobile network" is "existent anytime and ubiquitous," which is ignited by population of mobile terminals including wearable devices, a "digital currency" emerges as a manifestation of any commodity.

If Marx's Das Capital fully explains the theories of "surplus value" in "production sector" and "currency exchange," the "CodeChain digital currency" theory further illustrates a "value system in circulation and sharing"; the CodeChain implements a measurement standard which is "digitally traceable and quantifiable" measurement standard, i.e., a "digital currency" may emerge to become a "universal equivalent." It is named herein as "SGR" (Special Goods_Drawing Right, a "unit of bookkeeping of CodeChain digital asset" created by the CodeChain digital asset exchange).

"SGR" is originated from "circulation and propagation," while use of the SGR is through the "CodeChain two-dimensional code system." The quantized "UN treasure, citizen wealth" further includes an objective value of international wealth of "UN credit and national credit," thereby entering the new ear of "the Wealth of Nations."

From the perspective of human and with the digital person (proxy of human in the digital world) as the basic network element, the CodeChain technology solves the problems of CodeChain network in relation to information sharing, information verification, information monopoly, and information tampering through decentralized data, and effectively lowers system operation costs. The CodeChain technology inherits the decentralized market innovative vitality from the micro perspective based on multiple subjects, uniform code issuance, real-name authentication, and macro regulation (different CodeChains based on different subjects constitute their own set of ecological systems), but also proposes a centralized management concept from the macro perspective (realizing interconnectivity in the macro sense), thereby solving various tasks in information supervision and verification as well as preventing illegal activities.

The above approach may reply to the core critique proposed by Hayek against socialism, i.e., the activity of an individual person is unpredictable, so it is infeasible to construct socialism based on a planned economy.

It is seen that the CodeChain is not only a big upgrade of the block chain from the perspectives of ideas and technologies, but also implements a local decentralized model efficiently with a lower cost; while retaining the advantage of decentralization, the CodeChain also overcomes the core dilemma of block chain technology.

Further, the fundamental reasons for many hypotheses in economics to be untenable lie in the blind belief in the basic theorem of "sum of parts equals to whole." Parts cannot be pieced into a whole: the whole needs to understand the "envision of top-tier design."

The drawback of blind belief in "sum of parts equals to whole" lies in that: to find the origin of a thing, breaks the thing up to obtain its components and basic parts; the smaller the thing is divided, the more fundamental parts are obtained. Quantum entanglement occurs at the micro level, while CodeChain is a manifestation of the quantum entanglement from the micro ro macro level.

It will be finally understood that the "conceptual" parts of all scientific theories substantively have no differences from the philosophical concepts or religion concepts, and the best way to deal with the concepts may be neglecting them. According to this analysis, falsifiability will become insignificant in the future. Of course, these theories may not be regarded as scientific theories in the future, but a mental tool for explaining sensing. If this ideology becomes main stream in the future, it actually breaks through today's "scientific era" (termed relative to the historical wizard era, religion era, and philosophy era), and the human beings realizes mutation in ideology. Subjective consciousness cannot determine yet how many entanglements there remain and what kinds of effects can be generated by the entanglements.

Therefore, "brain," "central nervous system," and "peripheral nervous system" have work divisions; information convergence ("entanglement") occurs more often in "brain"; the "central nervous system" is "quantum backbone network," and the "peripheral nervous system" is responsible for information acquisition and feedback control. Subconsciousness is a real entanglement. The conscious mind features "one" or "one creates two"; and the subconsciousness features "one splits into two"; the subconsciousness is a natural embodiment of "entanglement," while the conscious mind is a manifestation of collapse of quantum state.

To rediscover the world, the shackles of inherent "thought" should be broken so as to perceive in a higher dimension; without entanglement, there would be no cognizance; without cognizance, there would be no wisdom; the micro quantum scale is reflected into multi-dimensionality coupling in the macro representation, which is not equipped to artificial intelligence. Human wisdom, seemingly abstract and complex, is actually shallow and simple. Exploration on the relationship between quantum entanglement and wisdom is the initial intention for designing "digital person Tangled Angel Brain."

The influence of thoughts on the micro world/mesoscopic world through observation, has a set conclusion in the entanglement field (which has been shown in the book Water Knows by Japanese scientist Masaru Emoto). When facing the problem of how to explain the macro world, there apparently lack enough theories. Mathematics cannot fulfill this mission, because it has a fundamentally wrong hypothesis "sum of parts equals to the whole." Cognizance is actually only an imagination from brain nerve activities. It is currently still unknown how to combine the cognizance with "objectivity" so as to generate a real influence.

The computer program is established over "algebra"; while the combination of geology and algebra constitutes complete mathematics: geology and pictograph are two similar types of meaning expressions, which is also a cognizance wisdom of human. CodeChain is a higher dimensionality, which is implemented based on "top-level design." By connecting digital persons via the CodeChain and converging love, a tangled angel brain is formed. Where the atomic elements which constitute an element come from? This question has a great cognizance significance. The value of a metal is only a psychological price given by human. Therefore, to highlight the importance of cross-discipline, the CodeChain emerges. Without life in the world, who senses information?

Eyewear Applications Based on CodeChain and AR Technology

Figure 3:
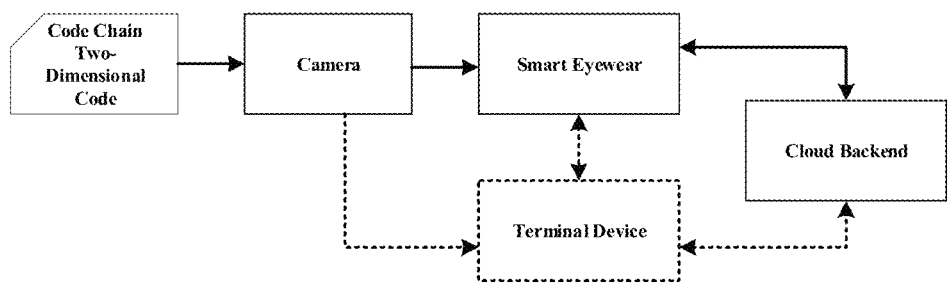
FIG. 3 shows a schematic diagram of a connection relationship of a CodeChain-based smart glass.

Currently, the two-dimensional codes are applied more and more widely. However, identification and processing of two-dimensional codes mainly rely on specific APPs in mobile phones, which are not only complex in use but also lack a uniform interface. The traditional approaches are far not enough to satisfy the requirements of mobile IoT. The present disclosure integrates a camera (chip) supporting a CodeChain IoT protocol into a smart glass. The smart glass may be used in a natural way, which is very convenient to identify a CodeChain two-dimensional code, freeing users from the troublesome process of using different APPs to identify and process different two-dimensional codes and of using mobile phones to capture two-dimensional codes, and enabling the users to identify any two-dimensional code as seen; in further conjunction with a backend uniform protocol and platform, the present disclosure facilitates faster development of the mobile IoT. FIG. 3 shows a schematic diagram of a connection relationship between a CodeChain-based smart glass, a smart terminal device, and a cloud backend.

In an example, the eyewear is bound with the mobile phone so as to implement definition of "digital person" and start operation. The eyewear corresponds to a "two-dimensional code" which may uniquely identify the eyewear ID; the "two-dimensional code" is scanned and accessed by a mobile phone (e.g., the mobile phone camera or WeChat has a uniform code-scan access function), such that "the mobile phone" and/or the "WeChat" are bound with the eyewear (the eyewear ID and the mobile phone WeChat ID both become digital person Ids). The "attributes" of code-scan access may be configured on the interface of "menu setting" in the mobile phone, e.g., language selection, voice volume, filter access, indoor or outdoor scene mode selection, etc.; then with the "uniform code-scanning" and "viewing hidden two-dimensional code" functions of the "mobile phone/WeChat," the "mobile phone/WeChat," after scanning the code, may not only implement a "closed-loop transaction function" but also may generate "a new two-dimensional code and/or a hyperlink superimposed with the digital person ID." First, functional realization (e.g., playing in real time, via a Bluetooth headset, the language corresponding to the two-dimensional code (in the case of multiple languages, according to the language automatically set by the eyewear/mobile phone); meanwhile, the "new two-dimensional code and/or hyperlink" is generated and presented in the mobile phone/WeChat, and the "code-scanning activity" is recorded, thereby realizing "whole-process traceability."

For example, a highway tollbooth collector wears the glass to "view," i.e., scanning the "payment code" of each driver or vehicle (which may start 4 or 5 meters away); based on the data obtained by code-scanning to access the CodeChain server, verification operations such as "driving license and plate verification" can be simultaneously carried out; besides, an additional function of judging whether the driver is a chauffeur or a taxi driver may be implemented. the eyewear may automatically focus and identify the "payment two-dimensional codes" corresponding to respective vehicles or drivers; after the identification is done, the "payment picture" is displayed on the eyewear screen; and then payment confirmation may be performed through control with a set action (touch, key-pressing, voice, etc.).

This embodiment offers an advantage that: the "payment code" (including a non-HTTP format command which is capable of executing a payment function at the cloud backend) may be generated through "uniformly issuing code" (including a uniform code issuing agency, a uniform protocol, but not limited thereto). After the eyewear scans and identifies the code to access, the parameters of the eyewear (e.g., digital person ID, scene, and action; if necessary, capturing the picture of execution while executing the code-scanning payment so as to record) are substituted to the cloud backend networked via NB IoT (Narrow Band Internet of Things), thereby completing the payment function. Secure payment is realized, because the whole process does not require a website access through connecting, in the http format, to the DNS parse server with IP address as the core; instead, it is a network-specific "secure payment" access protocol dominated with the CodeChain access protocol with a recordable scene. A similar eyewear worn by the driver may also identify a collection code uniformly issued and access the cloud backend to execute payment.

In a specific embodiment, the eyewear, watch, and mobile terminal in this example may all be embedded with a "sense core engine". "The sense core engine" is a software/middleware, which drives the optical camera to identify optical signals. The optical signal may be visible light, or an infrared ray, an ultraviolet ray, or an optical signal with light-shadow or frequency variation, or an optical lattice map. The read original optical information applies the CodeChain two-dimensional code coding/identification principle, and after undergoing classified identification, error correction, matching, screening and/or signal format conversion, operation instructions to the background server are generated. The operation instructions are transmitted to the background server by devices such as the mobile terminal, and by further processing based on transaction management according to corresponding rules, the following functions are implemented, such as download, opening APP, e-commerce, transaction and payment.

Figure 4:
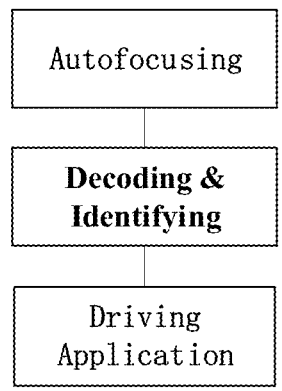
FIG. 4 shows a schematic diagram of auto-focusing and identifying a coding medium so as to actuate an application.

The "light frequency" may control a play frequency to refresh the screen via a "plugin" so as to form an optical lattice map on various devices such as TV, computer and mobile phone screen, and e-book reader screen, etc. As shown in FIG. 4, the optical lattice map encoded based on the CodeChain technology may aimed and automatically identified with an AR eyewear, such that a terminal device such as mobile phone/computer connected to the eyewear via Bluetooth may receive a parsed operation instruction transmitted from the eyewear and drive the "plugin" or other "light frequency" application (e.g., performing an operation such as playing the captions of a video animation), etc. Or, a device such as an e-book reader may be connected to the eyewear via Bluetooth or connected to the cloud backend via WIFI/4G; after the AR eyewear aims the optical lattice map on the light-frequency e-book reader screen to identify, the e-boot reader may receive the parsed operation instruction transmitted from the eyewear, or the eyewear transmits the instruction to the background server, such that the e-book reader is connected to the cloud backend via WIFI/4G and thus receive the instruction to drive the "plugin" or other "light frequency" application. In this way, when one wears the eyewear to view stories or video contents on the screen of the TV, computer, e-book reader screen, he may achieve an effect of synchronously play the associated content (those associated with a story or video content include "anime figures," barrages, comments, background instructions, etc., but not limited thereto). Application of the "light frequency" may allow "an eligible developer" to upload in a DIY way like an "APP store," which, after being reviewed, may be downloaded by consumers in their respective mobile phones or computers; the "light frequency" application may be experienced in conjunction with use of an AR eyewear: watching videos (e.g., via eyewear lens, flexible screens worn on arms, etc.) while reading books with bared eyes. The charges to the DIY authors may be based on each invoking, view, use, and comment, thereby vitalizing widespread entrepreneurship.

As to the WeChat VS Apple Inc. regarding Apple's shut-down of WeChat's "Reward Function," with the Code-Chain technology, after a consumer with eyewear aims the "Reward Two-Dimensional Code" presented in the WeChat and the eyewear scans, identifies, and parses out the instruction, the eyewear is connected to the mobile phone via Bluetooth (or the eyewear is connected to the cloud backend via NB IoT and issues an instruction to a specific WeChat pre-bound with the mobile phone) to thereby drive initiation of WeChat's payment program to complete payment.

Figure 5:
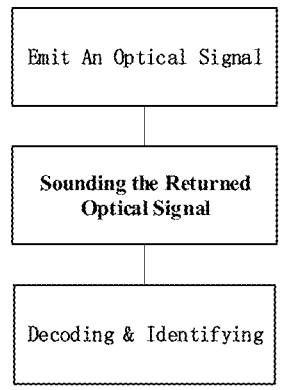
FIG. 5 shows a schematic diagram of sounding an acoustic-optical signal reflected from the coding medium to perform decoding and identification.

By providing a light sensing control method, a terminal, and a chip, a wearable device such as AR eyewear may sense specific scene modes such as indoor, outdoor, go shopping, museum when automatically focusing and scanning to access (the specific scenes may be sensed automatically or via manual control, e.g., voice control, touch control, or menu control, etc.), to set up a parameter model based on light sensing intensity, tone variation, etc., thereby forming "a judgment function." For example, in a scene of library, head down to read a book (focused-mode two-dimensional code identification with a short distance of 20 cm) and head up to look at a person 10 m away (10 m focusing) can be controlled automatically with the eyewear, without additional controls such as button pressing, touch, voice, etc. And/or, as shown in FIG. 5, a ranging method may be used. For example, a camera or other device emits infrared light, supersonic wave, or laser to a to-be-identified object, and receive the light or acoustic wave returned from the to-be-identified object via the camera, which realizes ranging; and then the object distance is computed based on the ranging. With this technology, the "distance differences" between the signals fed back from various angular positions of the three-dimensional stereoscopic code (a three-dimensional stereoscopic code structure based on the CodeChain two-dimensional code encoding mechanism) formed on the object surface are processed to obtain a mechanism similar to scanning a planar two-dimensional code, thereby completing identification and access of the "three-dimensional stereoscopic code." The three-dimensional stereoscopic code, which is distinguished from the planar two-dimensional code; due to its three-dimensional stereoscopic feature, it may be identified by "light sensing" of the "Code-Chain access" device; such access utilizing light sensing control is referred to as light sensing access.

In view of the above, there is provided a light sensing control device (or integrated chip), comprising an optical sensor, a register, a data processor, a memory, and a display (not compulsory). The light sensing control device may optionally comprise: a sensing array, a sample and hold circuit, an A/D converter, a function register, a data register, an index register, a control circuit, an I/O circuit, a processor, and a memory.

The sensing array acquires an optical signal; the sensing array is connected to the corresponding signal input end of the function register; various data signal ends of the function register are connected to the corresponding signal input ends of respective data registers; the data signal output ends of various data registers are connected to the data signal end of the index register; the signal end of the index register is connected to the signal end of the control circuit; the data signal output end of the processor as the output of the light sensing control device to control the application corresponding to the mobile smart device configured with the light sensing control device, or control the specific function module to identify and decode the captured two-dimensional code.

In an example, a "smart travel" Bluetooth headset (with a CodeChain access camera) based on CodeChain access is provided, which may view a hidden two-dimensional code (setting the personal attribute preference in advance) propagated by a multi-language satellite TV of Belt & Road.

With walking on the street, the eyewear (also including a two-dimensional code worn personally, and the hidden two-dimensional code) is like a tour guide to tell the histories and stories of the city (the eyewear is accessed to the hidden two-dimensional code; the headset plays the histories and stories of the city in a specific language).

People may escape from the world ruined by screens and experience the real world to interact with person and communicate with things. The multi-language versions of voice communication are configured and selected by the headset:

For example, providing a good opportunity to learn Shanghai dialect and understand the history of Shanghai Bund, to vitalize historical values of announcers and dubbers (telling old stories of Shanghai) and the resources of old Shanghai people (historical accents and languages), give a play of the vitality of Shanghai histories and cultures, and build up city cultures, vitalize non-historical culture heritages, and build a "CodeChain museum" for smart travel and smart city. For example, reliving the history and culture of Silk Road; posting local dramas such as storytelling, playing & singing, and Shaoxing opera. They may be played by headset accessed to the eyewear, and the mobile phone may display various kinds of "newly generated CodeChain two-dimensional code, and/or hyperlink":

The eyewear has a setting configuration function, wherein the menu may be set through voice control: accessing and playing a video or recording by each time of code scanning; enabling continued play from the break point by scanning the code again; or, first finishing play of the previous content and then starting the next one. The menu may also be set in the mobile phone/WeChat by scanning code (uniquely corresponding to the ID of the eyewear) with the mobile phone/WeChat, thereby implementing a customized function.

Figure 6:
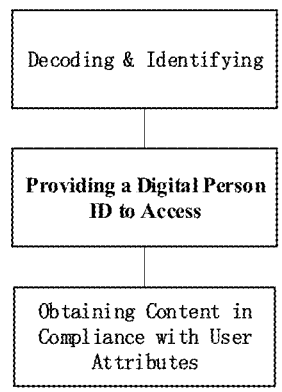
FIG. 6 shows a schematic diagram of providing a service in conformity with the attribute of the digital person based on the digital person identity.

FIG. 6 shows a schematic diagram of obtaining, by different users, different contents based on a same two-dimensional code. Hereinafter, illustration will be made with another light sensing access manner and application scene as an example:

In an exemplary application of 5D theater, a "hidden two-dimensional code" (e.g., a light lattice map generated in the form of light-dark variation, refurbishing frequency variation, invisible light, etc., which is invisible to bare eyes but identifiable by an eyewear) is superimposed in the shot movie; the audiences enter the theater with "modified 3D eyewear, i.e., the eyewear described above"; when the audiences watch the big movie on the big screen, based on their individual attribute settings (e.g., gender, preferences, desired movie ending), the eyewear scans the hidden two-dimensional code to access; and based on different attribute settings, "a small movie specific to each audience" is played on the small screen of the eyewear; the watched movie may not only include "gossip voice-over" but also may include a totally different "ending according to settings of preference attribute." Besides, after the eyewear scans the code and quickly identifies the two-dimensional code instruction, it may directly invoke gossip short clips about the movie, which are pre-stored in the eyewear; it may also contact with the backend in real time via a WiFi/5G communication module; the backend drives the mobile phone already bound to the "eyewear" to play and save a "play record" on the mobile phone for later check. The digital person DNA of the user may also be superimposed with the mobile phone so as to share the obtained ending and other content to the SNS network for propagation. An ideal mode is to instantly download and play the video introduction and other operation instructions to the eyewear without intervention of the mobile phone.

Similarly, "a hidden two-dimensional code" may also be superimposed on various static or dynamic objects in a scene such as museum, gallery, exhibition, etc.; corresponding information such as background introduction and dynamically presented content may be obtained through eyewear identification and access; the content may be "audio played" via the Bluetooth headset of the eyewear to achieve a natural audio instant effect like human communication (i.e., every piece tells a story), but also may be displayed on the display device of the eyewear; it may also be recorded and presented in a mobile phone previously bound and linked with the eyewear. Moreover, the individual digital person ID may be superimposed; based on the preset preferences, the obtained information can be more pertinent and personalized. Or, the hidden two-dimensional code may also be in a polarized light mode, i.e., "the display screen uses a polarized material." The AR eyewear may identify the polarized light such that the "0°, 90°" polarized light generates 0, 1 (i.e., a black-white alternating effect of a two-dimensional code) when being identified.

The display device may further comprise a flexible display screen, which is a flexible and bendable electronic circuit directly applied to a human body skin, e.g., implanting the circuit into skin to turn the skin into a touch screen. Such an electronic circuit comprises a flexible transistor, an organic LED, a sensor, and an organic solar cell, etc., which are connected by a malleable flexible wire. Of course, these components are made very thin and coated onto a flexible substrate to form a large-area electronic circuit resembling skin and then implanted into human skin. Such circuit has a very high sensitivity; even a slight fibrillation of muscle can be accurately sensed. Existing wearable devices cannot achieve such high sensitivity. Further, in conjunction with a quantum CodeChain material, access and display may both exhibit a non-silicon-based quantum entanglement effect, such that it is not only enabled to generate "a quantum entanglement effect" at the access instant via the tangled angel brain, but also enabled to feed back to the electronic skin through the quantum entanglement effect during the reading process, so as to further stimulate the sense organ, thereby obtaining a benign circle of positive feedback.

By controlling the flickering frequency of light (e.g., LIFI light) to cover and irradiate a real object, an optical signal capturing unit (camera of eyewear) is enabled to obtain an optical signal; through sensing and identification with an optical signal identification middleware, the optical signal capturing unit may be driven to identify the optical signal; the optical signal is decoded by a decoding unit and converts, after decoding the optical signal, the optical signal into a server operation instruction corresponding to the optical signal; a transmitting unit is configured to transmit the server operation instruction. In this way, a "LIFI CodeChain access" is formed. with the festival light show in Shanghai Bund, the "LIFI CodeChain laser" may be played, such that the eyewear may access to generate a two-dimensional code (digitalization) superimposed with its own DNA and the picture video simulating the real scene, etc.

The LIFI ray covering a real object may also be implemented by controlling the flickering/refurbishing frequency (frequency of light, simply referred to as light frequency) of the imaging on the computer/TV screen: an optical signal capturing unit (camera of eyewear) is enabled to obtain an optical signal; through sensing and identification with an optical signal identification middleware, the optical signal capturing unit may be driven to identify the optical signal; a decoding unit is configured for decoding the optical signal and converting the optical signal into a server operation instruction corresponding to the optical signal; a transmitting unit is configured to transmit the server operation instruction. Based on the above technology, "light frequency chain access" may be realized.

Example of "light frequency chain access": an apparatus configured with the light sensing control device can perform automatic focusing and "capture or continuously capture" the coding medium based on the environment surrounding a mobile smart device and/or the state of the mobile smart device so as to identify the "two-dimensional code" existing in various pictures, thereby implementing a control effect of stepless amplification of "code-scanning access" similar to "multi-point touch" (i.e., the aiming and focusing actions of a common two-dimensional code scan without manual intervention), thereby becoming a standard function of the "smart eyewear" in this example.

An example: an AR eyewear accessed through "light sensing access" and "light frequency" access; an apparatus configured with the light sensing control device can perform automatic focusing based on the environment surrounding the mobile smart device and/or the state of the mobile smart device, and may be controlled by operations such as voice, touch, and menu. The display may project an image which has been adjusted by the lens on the nose pad onto the eyewear lens, and finally projects the AR effect using the light wave guide structure of the lens into the human eye (a micro OLED display may be built in the eyewear holder, to thereby implementing a control effect of stepless amplification of "code-scanning access" similar to "multi-point touch" (i.e., the aiming and focusing actions of a common two-dimensional code scan without manual intervention), such that display of the screen image may be manipulated through eyeball rotation. It may also be a "colored, flexible, skin-like display": the color on an ultra-thin nano structure surface may be changed by externally applying a voltage.

Moreover, this ultra-thin nano structure surface may reflect the surrounding ambient light. A thin liquid-crystal layer is a sandwich structure made on a metal nano structure, resembling a shape of a micro egg case, which may absorb light of some wavelengths while reflecting light of other wavelengths. The reflected color may be controlled by applying a voltage over the crystal liquid layer. The interaction between the liquid crystal molecules and the plasma waves on the surface of the nano structure metal surface plays an important role in implementing a full-color-tunable screen without polarization dependence. Combination with flexible and scalable nanometer material: the thin film-like nanometer material is formed by an interweaved and complex nano fiber silk screen, wherein the silk screen is attached to the solid matrix using an electroplating technology. Besides flexibility and extensibility, it also has properties of transparency and high conductivity; this nano silk screen may be created by electrospinning of polyacrylonitrile microfibers. First, the microfiber reel is wound around the solid matrix lap by lap to form a complex net structure, and then metal alloy is sprayed on the silk screen and copper plated. In this way, eyewear access, signal conduction, flexible display, and sensing control are integrally implemented.

With population of the above mode, in the real world, each person may be deployed with a "hidden two-dimensional code" to form an issuer for the "eyewear wearer" to identify and access, thereby obtaining matching information based on different attributes of the wearer or the different conditions set by the code issuer; for example, wearers with different attributes obtains different personal introductions of the corresponding issues (the elements accessed by the light frequency chain and the manufacturer of eyewear may be referred to as the introducer or accessing person and thus becomes part of the "value chain, value CodeChain"); at this point, after the eyewear scans the code and quickly identify the two-dimensional code instruction, it contacts in real time with the backend via a 5G communication module, the video instruction and other operation instructions are instantly downloaded and played without manual intervention or intervention of other devices such as a mobile phone.

Four-Dimensional Space Class Application in Audio-Visual Teaching:

A teacher prepares teaching courseware of high level, middle level, and low level, and generates and displays a teaching two-dimensional code (which may be textual, or may be a screen display of ppt, or may be a hidden two-dimensional code on the teacher's face or body: the students pre-set a level based on their acceptance degrees, such that when different students access the courseware by scanning the two-dimensional with the eyewear, different contents can be displayed (on the eyewear screen) based on the different levels, which may also be displayed on the mobile phone in signal connection with the eyewear signal via Bluetooth, while the high, middle, and low levels may also be preset in the mobile phone; the contents corresponding to respective levels may be pre-stored in the eyewear or mobile phone, or may be obtained from the cloud end over network and correspondingly displayed according to instructions.

The present disclosure provides a method, apparatus, and system for generating an AR application and presenting an AR instance. According to the embodiments of the present disclosure, pre-fetching of local recognition and cloud recognition and a smart switching function are implemented through cooperation, and by pre-caching a local recognition packet having part of augmented reality instances, firstly performing local recognition with the local recognition packet, and then performing cloud recognition after failure of the local recognition, issues such as excessively occupying the storage space and too long network response delay are avoided. Besides, the recognition modes may be switched based on the user's needs in the real scene, which satisfies the versatility of the user scene needs. The present disclosure not only implements the recognition and tracking function of the underlying object, but also may provide functions of facilitating presentation of the augmented reality content, including presentation of video and 3D animation content. The present disclosure interprets and executes the script file through an interactive control submodule, thereby implementing a cross-platform augmented reality interaction definition mechanism, thereby being suited for multiple platforms and causing the user' interactive activities more flexible.

Eyewear Applications Based on CodeChain and AR Technology

The above modes may be widely applied to the real world and a real scene, but also may be applied to scenes such as movie, TV, stories, games for further propagation.

In the digital mode, e.g., a star concert, a large poster including a hidden two-dimensional code is put up; with a designated AR eyewear, the preset user head portrait may be superimposed on the star image photographed by the eyewear camera to synthesize a "close group photo"; or, in a simulation mode, while a video recording is shot by the eyewear in a natural landscape, the user may embed his head portrait image into the landscape. For such content integrating the content provided by the user with the short picture, after it is superimposed with the user's own DNA (digital person ID), a CodeChain two-dimensional code is issued and shared to the SNS, or other networking service, such that reading, sharing, liking, rewarding, applying, shopping, and anti-counterfeiting tracing may be implemented in the Moment.

Figure 7:
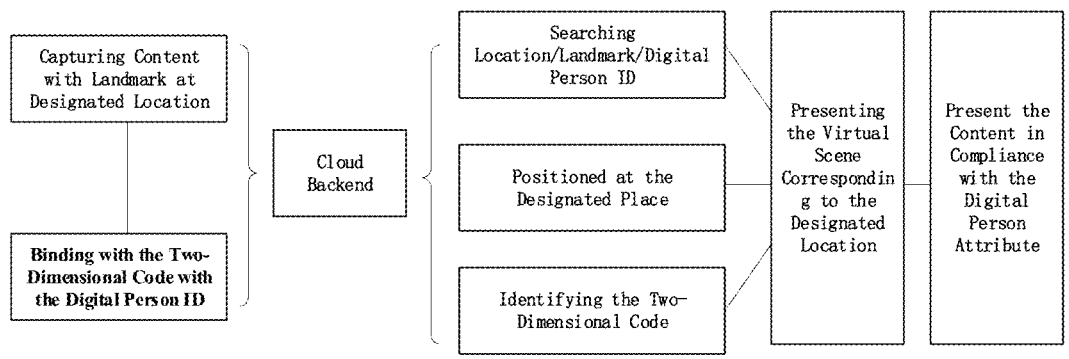
FIG. 7 shows a schematic diagram of application of CodeChain in conjunction with the scene in AR/VR field.

Exemplarily, with the AR eyewear in conjunction with the LBS, particularly the landmark information, there is provided a mode of generating a CodeChain two-dimensional code bearing its own DNA. As shown in FIG. 7, the AR eyewear has been bound with a digital person ID; in a particular LBS scene, a video is shot or a LOGO including a landmark is captured; after the video/picture synthesized with the two-dimensional code bearing the DNA is uploaded to the cloud backend, the two-dimensional code may be searched according to a condition including: LBS, identification matching with the image superimposed with the landmark logo, the digital person ID (time sequence of superimposition), and a state of the two-dimensional code being scanned or forwarded (superimposed with the LBS information). The person who uses the AR eyewear or the specific digital person ID to upload the two-dimensional code with the digital person ID is regarded as the "master of the landmark territory"; certain rights are granted to the master, such that the physical world may be shot and scanned through for example a "Master APP" to establish a "digital person kingdom" in the "cyber space" in parallel (encircling a ground), creating a mode of correspondingly mapping the real world to the digital world over a physical real estate model, which is a new mode of eliminating real estate bubbles and supporting widespread entrepreneurship and innovation; while the AR eyewear becomes a tool for creating value through labor production creativity.

The AR-based Master APP client and application comprises: an AR engine layer module, an AR resource module, and a plurality of external application modules. The AR engine layer module is configured for loading an identification parameter into the AR resource module when receiving an AR function initiation instruction transmitted from an external application module; the AR resource module is configured for constructing a target AR scene "digital person kingdom" with an AR resource package which has been successfully identified based on the identification parameter, and invoking a corresponding external application module based on the received interactive operation information of the target AR scene.

Method of using the APP client of the AR: scanning the "digital person kingdom" two-dimensional code with the AR eyewear to enter AR scene access; or scanning the landmark logo in further conjunction with the LBS information (avoiding remote scanning) to implement the AR function at the Master APP client. This improves user experience and increases user loyalty to the APP client.

Further, the method of configuring the master further includes: superimposing GPS geographic location information based on the XML configuration file information, or superimposing landmark LOGO information; and shooting the scene and superimposing and synthesizing the master's own picture or animation figure to the picture or video, wherein a template paste image may be generated based on the original image or original video customized and uploaded by the user, and combined with a preset three-dimensional scene model; the combined image or video may be displayed by AR; the three-dimensional virtual-real combined display scene is combined with the user picture; meanwhile, the user may customize its own AR display scene. With this method, the user may customize the video or picture of the AR scene and meanwhile generate a two-dimensional code with his own DNA to be uploaded to the cloud backend. In this way, when other visitors match the LBS information by shooting the landmark (image identification and matching with the cloud end) or GPS positioning, they may know the information about the master of the digital person kingdom; the superimposition may be controlled by a menu-type selection or voice recognition.

Because the master uses the AR glass to generate a master two-dimensional code/a hyperlink and an image-text video, containing the master ID, landmark, and LBS information, as well as, such that when a visitor wearing the AR eyewear to visit there, he may obtain the master two-dimensional code/hyperlink and the image-text video based on LBS access; the visitor superimposes his own digital person ID (DNA) on that basis and generates his own two-dimensional code/hyperlink and the image-text video, which is uploaded to the cloud end after being saved locally or directly uploaded to the cloud. Advantages of generating the two-dimensional code: it may not only be printed and stuck offline, or shared online, to facilitate visitors to access (similar to the LBS digital scene entry); it may even include the master's own DNA so as to provide more ways to access the digital person kingdom scene. The digital person kingdom (a new world reconstructed by the CodeChain) offers a digitalized expression, analysis, and utilization of a combination of various objects physically existent in the real world, various kinds of people, and activities of human beings. The master initiates this activity to generate a source two-dimensional code; with access and propagation (the two-dimensional code may be generated repetitively and superimposed with various contents including new DNAs) of newcomers, the digital kingdom may be extended limitlessly.

The technical solution of repetitively generating two-dimensional codes becomes a basis for a practical social game, thereby implementing applications of IoT in real life. For example, an AR game method is extended from a master two-dimensional code 61, comprising: associating the master two-dimensional code 51 with yin-yang and five elements (ancient Chinese philosophy), Heavenly Stems and Earthly Branches (ancient Chinese chronological manner), horoscopes and Chinese zodiacs, and chemical elements, such that a visitor scans the master two-dimensional code 61 with an eyewear (or mobile phone), wherein the two-dimensional code 61 includes the properties (e.g., oxygen element) of the master A.

A game user B (with a property of hydrogen element) generates a new two-dimensional code 62 for the second time based on the two-dimensional code 61, wherein the two-dimensional code 62 includes a synthesis (water element) of the attributes of the master user A and the game user B. Further, a game user C may generate a two-dimensional code 63 for the third time, the two-dimensional code 63 includes a synthesis of attributes A, B, and C. There is no limit on the times of generating the two-dimensional codes. Of course, the generation issuer may arbitrarily set the attributes in the game (digital person kingdom).

Exemplarily, there is provided a TV AR game system, comprising: a card, a camera, a set-on-top, and a TV; wherein the card is placed within a camera-identifiable region, the camera being connected to the set-on-top, the set-on-top being connected to the TV, and an image recognition library, a model related to the image recognition library, and a UI scene being stored in the set-on-top; wherein the camera is configured for acquiring video information in the identifiable region and transmitting the video information to the set-on-top; the set-on-top is configured for processing the acquired video information, identifying the card information, and matching the identified card information with an image in the image identification library, and in the case of successful match, invoking the model and UI scene associated with the image, and controlling TV display; and the TV is configured for displaying the video information acquired by the camera, the card-matching model and UI scene outputted by the set-on-top.

Exemplarily, there is provided a method of generating one or more augmented-reality AR object by a mobile device, the method comprising: capturing an image of one or more target objects, wherein the one or more target objects are positioned on a predefined background; segmenting the image into one or more regions corresponding to the one or more target objects and one or more regions corresponding to the predefined background; converting the one or more regions corresponding to the one or more target objects into a digital image; and generating, at least partially based on the digital image, one or more AR objects corresponding to one or more target objects.

With CodeChain access and use manner described above, the present disclosure may implement effective evaluation and monitoring of the activity of each person by the whole society based on the social justice a distribution justice proposed by Hayek.

Further, by constructing an information society through CodeChain, it is the ultimate purpose of information development to realize transformation from the industrial society to the information society; the development of the above two stages is to create conditions for realizing this objective so as to provide theoretical grounds, support and guarantee for "world sharing and world commonwealth"

The information society is built based on the reality space and network space; therefore, it is needed to abstractly represent the social system of the reality space to the network space and through information development and construction, support an integral information execution environment of various trades and industries in the network space.

Its basic operation mode is to promote the social information activities (including information acquisition, processing, storage, transmission, and a process from problem to decision) to the network space so as to realize high-speed and efficient operation across time and space, and implementing the information processing result to the reality space, thereby realizing a precision and efficient implementation. Further, the human activity is digitalized and informatized for management and control; by converging "each digital person" through "CodeChain," a Tangled Angel Brain is formed; the CodeChain is physical convergence, while the Tangled Angel Brain is thinking convergence.

Meanwhile, the IP-based Internet/IoT is currently constantly evolving, and the artificial intelligence extended therefrom has a development prospect: the survival and preference of an individual person is designed and satisfied by a sensor control system, which is equivalent to the case that the existence of the individual person is dominated by others. The present disclosure attempts to establish a model based on the idea of "quantum CodeChain" (cross-disciplinary product, crossing physics, life science, information science, financial economics, philosophy and social science, and religious belief, etc.) from another dimensionality and another way. In a sense, we are exploring a simple and computable low-cost propagation model of credit information based on a belief that information uncertainty is fundamental to the society.

The quantum CodeChain is a quantum network mechanism of generating entanglement reaction and transmission, which uses the "carbon-based double-stranded DNA" attribute (wherein the silicon base is single-stranded through "light in replacement of electricity" access to 5W (why, what, where, who, when) constituting the world; according to the quantum CodeChain, a digital person brain is also considered as a quantum computer; the coding medium (e.g., optical two-dimensional code) of the quantum CodeChain becomes an externally input stimulation to the brain synapses; various digital persons become individual brain cells of the Tangled Angel Brain by entangled link to the human brains. With the "quantum CodeChain" access and transmission (transmission of signals via the neural network), the quantum computer of each "digital person" may excite the "thoughts of each digital person" via the entanglement formed by quantum code access, causing the quantum CodeChain (retaining the structure of the information) may converge the information and energy of the whole human kind into "Tangled Angel Brain."

The life biological mechanism of human-machine interaction is not a pure physical electric signal; instead, light is a very important medium. Light in replacement of electricity will become the mainstream in future link, because electricity only has a one-dimensional physical property, it can only serve as a medium; however, light has a multi-dimensional property including physics and information science (the structure of the information may be retained), such that entanglement is inherent in light. The link access of quantum chain with light in replacement of electricity is embodied as entanglement in the micro level, as coupling in the mesoscopic level, and as convergence statically in the macro level.

The optimum manner of quantum chain-based access is the "light in replacement of electricity" sensing access manner. With a quantum device such as "smart eyewear," uniform access to the "code issuing center" (quantum computer) is enabled through "reflection/propagation" of light signal (the receiving device may sense quantum entanglement effect, but not limited thereto).

Smart digital devices are constantly enriched and developed: smart cameras, smart POS machines, automatic vendors, smart sensing devices, etc. (which can become constantly compound and smart). The population of mobile terminals and wearable devices enabling quantum CodeChain access and the advent of the new IoT age constitute the physical basis of the "digital person." Example of the wearable device is smart eyewear (the material in use is a low-energy-consumption electronic device like Weyl fermions; due to its stable topological property, it plays a significant role in high fault-tolerant quantum computation).

CodeChain is a digital model embodying basic human activities. The "code" in CodeChain may be embodied as a two-dimensional code, or a multi-dimensional code, a hidden two-dimensional code, or even any coding medium such as a "quantum code" which can be digitalized for sensing access, as long as it can record the information structure. Such recording may refer to recording in the "code," or a "record" with consensus based on "CodeChain" verification, or a recording through accessing the "code issuing center," as well as a combination of various manners above. The "code" in the quantum CodeChain is defined as such: code may be a data structure (service provider, service content, service state, source, associated service, and attribute, etc.) describing activities; until it is accessed (i.e., observed) to generate a collapse of wave function, can it be determined as a specific "state" from the qubit quantum liquid state (it needs support from quantum bit materials and quantum computers; thereby constructing a qubit world different from the silicon-based bit world). Human-service link protocol: forming an entanglement effect to generate a new code and a new link through "quantum CodeChain" access based on two-dimensional scanning, eyewear viewing, and thinking, etc., to construct a "quantum CodeChain." The quantum CodeChain ideology points out that to maintain truth and reliability of information propagation, there requires human involvement, while the human involvement is on the basis of CodeChain model and embodied through accessing the CodeChain network via activities such as two-dimensional scanning, viewing, and thinking.

The digital person serves as a proxy program for personal entrustment, and a unique entry for network interaction between an individual and the network; the digital person may automatically execute some actions of providing, filtering, and forwarding data according to the entrustment of the person. Extended Meaning of Code Formed in Combination of Digital Person: a repeated consumption voucher obtained based on human travel consumption activity, general delivery voucher-consumption code form obtained from human pre-paid consumption activity, and a logistic delivery voucher—logistic code form obtained from human warehousing and logistic activity.

Code Issuing Center: a globally trustworthy and unique data center for issuing a to-be-scanned code (including various sensing access) to perform uniform code issuance; the quantum computer is a best selection. According to the quantum CodeChain-based information processing network based on uniform code issuance, the method for the same, and the sensing access device, an issuer files a corresponding code issuing request with a core administrator (code issuing center), the core administrator or a code issuing agency authorized thereby generates a coding medium (the coding medium may be captured through "viewing" and/or "thinking" and is accessed and transmitted via quantum code), such that the accessing person can obtain the information matching the identified coding medium when identifying the coding medium with an equipped quantum sensing access device (i.e., the probability state of the observed information qubit quantum state, the collapse of the wave function, is determined, becoming significant to the macro world), and further obtaining the following information provided by the issuer, including: information to be issued by the issuer, attribute state of the issuer, attribute state of an interacting party associated with the issuer, and information (qubit quantum state) obtained from identifying other coding medium with the quantum sensing access device equipped to the issuer. This access manner is referred to as "quantum CodeChain access."

Further, the silicon-based civilization (with the silicon element as carrier), i.e., robot, will rule the world and will possibility extirpate human; by accessing the "Tangled Angel Brain" via quantum CodeChain to converge the power of all human beings being to fight against the robots.

Definition of the Digital Person: in the mobile network era, with population and promotion of "digital person eyewear" and "quantum CodeChain," the activity transaction of each space-time (5w IoT space-time) and node in life+space may be quantized, recorded, and full-process traceable (i.e., thinking and activity of human), and their actual social effect can be observed (the action and reaction of the digital person individual against the human society).

Each observation (similar to macro observation in the quantum theory) of each digital person will generate a "physical action" on the "material world" of earth: causing changes to the earth, and such gradual changes make the earth evolve.

Each digital person is like "each brain cell"; the quantum CodeChain is like a brain neural network, the access point (two-dimensional code/hidden two-dimensional code) is like a brain synapse; the eyewear is equivalent to a neuron of transaction nerve; while the network formed by "digital persons" of different subjects via quantum CodeChain access is similar to a "brain functional region" with different functions; in this way, the individual "digital persons" can converge to form an "Tangled Angel Brain."

The CodeChain can be narrowly defined as an access manner of substituting the digital person ID and transmitting it to the cloud service backend by two-dimensional code scanning (offline) and Moment tapping (online) to thereby implement full-channel access and full-process traceable management.

Difference and Relationship between CodeChain and Two-Dimensional Code: a typical "two-dimensional code" is a static code, which is not linked with the background server or controlled by a code-scanning APP, while a "CodeChain two-dimensional code" is issued under the control of the background server and accessed by code scanning by the APP under the control of the background server, thereby forming an coordinated link of "two-dimensional code+server+code-scanning APP."

The CodeChain is broadly defined as such: the accessing device is not limited to a smart phone, but further includes an AR eyewear mentioned herein; the access protocol is not limited to scanning and tapping, but further includes sensing access, thinking, and quantum CodeChain access (using the quantum condensed state qubit material, which generates quantum entanglement, i.e., wave function collapse, upon accessing); the code issuing center also uses the "quantum condensed state mechanism."

For example, a moral quality of a person can only be determined (i.e., collapsed) by a subject-specific observer based on "social network and previous comments." For another example, the value of a quantum CodeChain digital currency refers to the definition based on the digital person network and the morality index at the instant of use, collapsed to a specific numerical value.

The angel tangled earth serves as part of "value" system of the human society; "advertising capitalization and circulation propagation valuation" is only one of the applications of commercial activities of the digital person network, which will bring every person a living principle of "one for all, all for one;" every person lives in a "me-centered digital person network system"; when he sees an advertisement (O2O access, he may verify its authenticity and perform value judgment through SNS search, and may allow comments for his friends' reference. All publicity points (the touch points of all merchants, i.e., what is seen is what is gotten, existent at any time and any place) constitute the neural synapses (O2O) access points and the neural network propagation (SNS value chain propagation) of the angle tangled earth.

Each person is like a "brain cell"; the O2O two-dimensional code serves as the access point of the "brain synapses"; the digital person network is the brain neural network; the morality index refers to the active degrees of different brain cells, which may derive different "brain active regions." The code issuance agency (i.e., code issuing center) will become a "brain center." In this way, an "angle tangled earth" is constructed; i.e., all digital persons on the earth are regarded as various brain cells; the two-dimensional codes serve as the access points of the brain synapses; the digital person network is a "brain nerve" of various attributes; the quantum CodeChain access is like a brain nerve reflex. The eyewear may adopt "a quantum condensed state access material."

Therefore, the code issuing center functions as a brain center to guide evolution of human civilization. The present disclosure is a great innovation bridges nations, races, classes, languages, and cultures, and guides the earthmen on how to adapt to the survival environment in the new situation.

Accessing the quantum CodeChain to the angle tangled earth is the characteristic of carbon-based civilization, which has a substantive difference from the silicon-based civilization. The carbon-based civilization uses the property of carbon-based double-stranded DNA (while the silicon-based civilization is single-stranded). It is the way of survival upon outbreak of the super crisis of "robot in replacement of human" when the AI development singularity point exceeds the total sum of the human beings on earth. It not only concerns fighting for work opportunities, but also explains the significance of human life.

If the thought of flesh men is a projection of the three-dimensional space of earth onto the heart of each person, i.e., a "four-dimensional space" derived from an arbitrary combination of the "three-dimensional space+time," the "angel tangled earth" is a "five-directional space," which may simulate and combination various kinds of "four-dimensional space" of the brain. Then, in the "five-dimensional space," how the love of human beings plays a role of mater will be studied, analyzed, quantized, and interpreted, wherein "love," instead of "profit," is the "source power propagated by the digital person network." Einstein described in a letter to his daughter that love, love in the human society, is the unseen force of the universe.

Therefore, a CodeChain comprehensive discipline may be formed by fusing politics, economy, culture, technology, information, biology, physics, materials, philosophy, history, psychology, yi-ching (ancient Chinese philosophy on the laws of heaven and earth), and religion.

The present disclosure enables scene (5w)-based specific subject access through various quantum sensing access manners, which can accurately trace back respective nodes during the information propagation process and implement value quantization (colloquially "morality index") of the qubit quantum state based on information propagation and transmission, as well as conversion between information energy. The energy herein does not refer to the thermodynamic energy, but a "source power" acting upon human society and driving the society to advance and operate.

CodeChain digital currency is accessed under a certain subject based on quantum CodeChain, serving as a tool for payment and value measurement; its life cycle spans across the life cycle of the subject CodeChain. Digital bank is an agency that makes two-directional conversion between the currency in the real society and the CodeChain digital currency. Subject of the CodeChain refers to a set of services provided by the original code (open services issued by the serving subject on the CodeChain). Life Cycle of CodeChain: starting from issuance of the original code by the code issuing center and ending upon complete termination of the service provided by the subject, which constitute the whole life cycle of the subject CodeChain. Information Object Propagated in the CodeChain: having the characteristic of quantum information, non-tampered during the propagation process; the associated information object has a quantum entanglement effect. Quantum calculation: the information object has a typical quantum feature during the propagation process, which may have a quantum tunneling effect and a quantum superimposition effect.

The code in the CodeChain technology is substantively distinct from the two-dimensional code in traditional applications: the conventional two-dimensional code is only a trigger and recording for a single activity. The code in the CodeChain technology has the following characteristics: 1) high reliability: uniformly issuing code, recording source, transmitting credit enhancement in the chain. 2) high applicability: one-time code scanning implements a plurality of activities (creating an order, payment, settlement, and generating a repeated consumption voucher). 3) high security: personal data protection isolation+compound multi-channel and encrypted activity data transmission. 4) traceability: by recording activities of all persons with the CodeChain and performing big data analysis, activity tracking and evaluation are enabled.

Implementation Model of the CodeChain: the merchant requests an original code from the code issuing center; the code issuing center issues the original code superimposed with the digital person DNA of the merchant; a propagator identifies the original code or propagation code (by scanning or tapping) to obtain corresponding information and may also obtain a new code superimposed with the propagator's digital person DNA for propagation; a consumer identifies the original code or propagation code (by scanning or tapping) to obtain, from the code issuing center, the information directed to the merchant's server so as to obtain services from the merchant, who may further obtain a new code superimposed with the consumer's digital person DNA for further propagation. During the CodeChain issuance and propagation process, the operation procedures of the propagator and the consumer may be performed iteratively, finally forming a CodeChain network covering a certain group of consumers.

Therefore, a new digital person world (cyber space) may be reconstructed via "quantum CodeChain." In the real world, there exist various physical things, as well as various kinds of persons and human activities. Currently, there still lacks an integration of them (things, human—thing, human-human) so as to be digitally expressed, analyzed, and utilized. The CodeChain technology labels all things (entity things in the real world, such as scenic landmarks, advertisements, commodities, etc., and virtual things (or services) in the virtual world existing in the Internet) in the world as "objects" (websites, online stores, etc.) with CodeChain two-dimensional codes and superimposes the attributes and NDAs (unique identifier) of corresponding CodeChain digital persons; in this way, a network (integrating the relationships between the above three matters) based on CodeChain implementation is constructed over the IP Internet virtual world and the real physical world; this network may digitally record (e.g., upload to the cloud; record in a general ledger) the activities (not pure transactions) of all human beings to thereby implement traceability.

Namely, a prescribed "CodeChain access protocol" (e.g., based on O2O offline scene access such as scanning a two-dimensional code, and a activity such as WeChat tapping based on the SNS propagation chain) offers a uniform expression manner (e.g., CodeChain two-dimensional code) of any arbitrary digital person or any matter (real or virtual) provided thereby, thereby providing a possibility for being available to any digital person in the digital person world (accessing by code scanning, etc.) and also providing a channel for any digital person to propagate the matter provided thereby or the matter provided by another digital person to the others (e.g., propagating a corresponding CodeChain two-dimensional code).

The quantum CodeChain technology may have three chains, among which two chains are historical record chains (where X-axis denotes all things=object, Y-axis denotes digital person; one-time interaction between the digital person and the object, i.e., (X, Y) representing a activity of human, forms a node; the digital person activity superimposed with the digital person DNA (e.g., IMEI number of a mobile terminal) and the digital signature of the digital person (a dynamic token based on the digital person DNA and the object scene) over the original "object"; the Matrix-Link formed by all nodes ("X*Y") is the underlying layer of the CodeChain.

The so-called dynamic token is to prevent clock offset of individual tokens by using time synchronization, synchronization between the server time and the built-in clock of the token, and the server will record the clock offset of each token. The algorithm may be a modified Hash algorithm, whose function may be expressed as H (Seed+SN+Time), where Seed—seed value; SN—token sequence number; Time—time. As the algorithm, RSA company offers two versions of algorithm, and currently is using an AES-based private Hash algorithm.

The third Z-axis for example includes the (X, Y) propagation chain (not limited thereto), i.e., quantum state qubit information chain (seen from X-axis, activity records of each person based on all things; or, seen from Y-axis, activity records of each person in the physical world); while Z-axis represents different persons' different views on the same matter and their emotional and thinking modes such as pleasure, anger, sorrow, joy. Labeled with (X, Y, Z) and with the "quantum CodeChain access protocol," the storage may be made in a distributive manner according X nodes or Y nodes, such that a digital person may access through X-dimension or Y-dimension, implementing credibility (based on trust on friends and recommendation), anti-counterfeiting (the records cannot be tampered), verification (the code issuance is connected to the trusted center to generate a two-dimensional code/hyperlink containing the credible identification), and tracing (the whole process is traceable).

In the three-axis coordinate system, the imaginary number concept is introduced, wherein clockwise rotation (similar to a direction of a vector, corresponding to a probability of a person performing a first activity) or a counterclockwise rotation (similar to another direction of the vector, corresponding to a probability of a person performing a second activity) of a certain three-dimensional coordinate is an expression of wave function similar to the quantum mechanics: when a person accesses the X/Y-axis (being performing first or second activity; to facilitate understanding, the first activity is referred to as "doing good" and the second activity is referred to as "doing evil") and is realized by the other person via the "propagation chain" of Z-axis (5w information such as who does, where to go), it is an external observation, causing "collapse of wave function," i.e., determined (actually the observer's subjective determination) as "a first activity/second activity," while with this concept, the generated X/Y-axis of the observation per se may be propagated via Z-axis, thereby generating another determination of the first activity/second activity of another "XYZ"; moreover, the intersection points (Z-axis) for the interaction between the numerous things/scenes (X-axis) with numerous persons (Y-axis) in the real world constitute the set of first activities and second activities of the "reality world."

The CodeChain network constitutes a directional map, and the service information and the payment information are circulated in this map. The following features may be seen: a) local property: in the CodeChain network, information circulation is limited to the directional map of the CodeChain network, which is isolated from the wide-area IP network; with the isolation, the confidentiality and security of information can be effectively enhanced. b) reliability of information: during the information propagation process, by superimposing the propagator's DNA (additional attribute) over the CodeChain, the probability of propagation of valid information is effectively enhanced, the probability of propagation of invalid information is lowered, thereby the reliability of information in the CodeChain network is significantly enhanced. c) equality: in the network, the consumer, the propagator, and the merchant are equal; any role may release associated attribute information, e.g., like, silence, etc., which technically eradicates the information unequal conditions between the merchant and the consumer. d) information isolation: personal information irrelevant to the service cannot be circulated in the network so as to isolate the personal information from the service, which also effectively enhances the security level of personal information.

In an example of a CodeChain-based electronic business flow, the consumer obtains digital currency for transaction and settlement. In the CodeChain, the information interaction between the consumer and the merchant is equal; the transaction parties performs the transaction through exchanging digital currency payment information and service completion information; the propagator (information intermediate) in the CodeChain serves as a witness to guarantee that the transaction information between two parties is not tampered, who may win a digital currency reward from its propagation activity. The digital bank provides a service for exchanging the digital currency with renminbi in the account and settling the transaction application between the parties such that the parties may obtain renminbi.

Wherein, obtaining the digital currency and settling are docked with the interfaces of the existing system, respectively; with promotion of the CodeChain digital currency and establishment of the central bank digital currency system a more convenient exchange system and circulation and settlement system based on the central bank digital currency may emerge.

It may be seen that, besides the code issuing center and the digital bank, each role in the CodeChain implementation model is equal in the information propagation process, which completely overcomes the drawback of the existing IP-based network that the information is all focused in the service provider, so as to provide most efficient technical guarantee for solving the fundamental problem in the electronic business.

Figure 12:
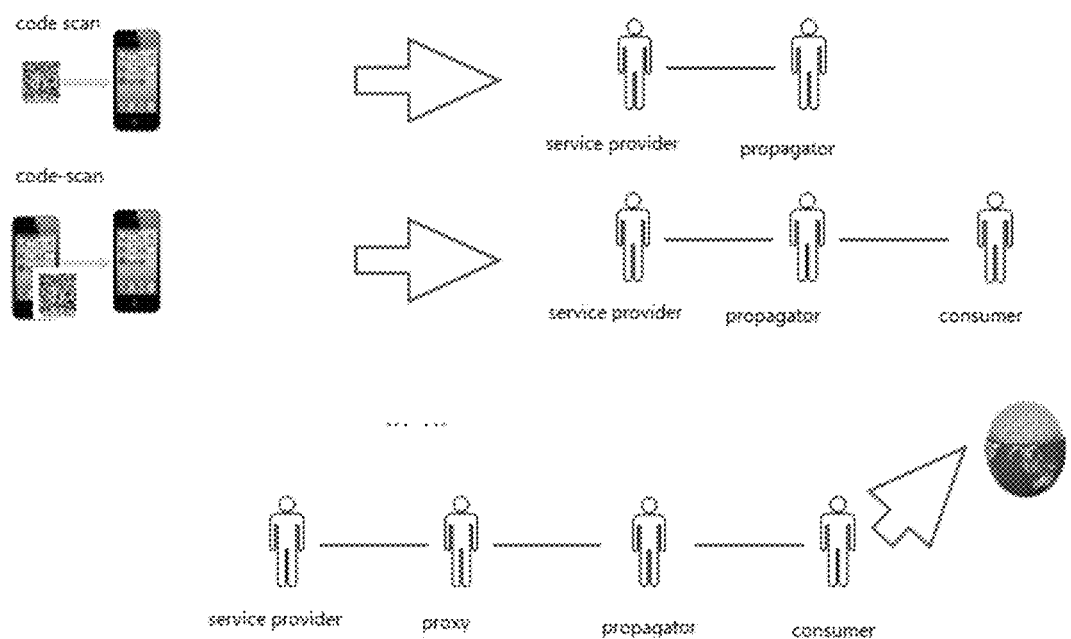
FIG. 12 shows a schematic diagram of forming CodeChain.
Figure 13:
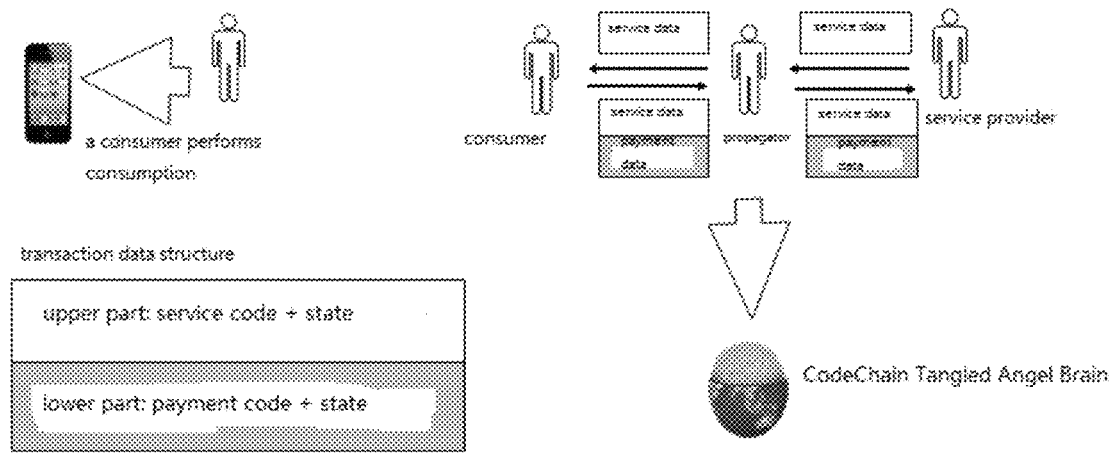
FIG. 13 shows a schematic diagram of computing and verifying under a CodeChain authentication mechanism.
Figure 14:
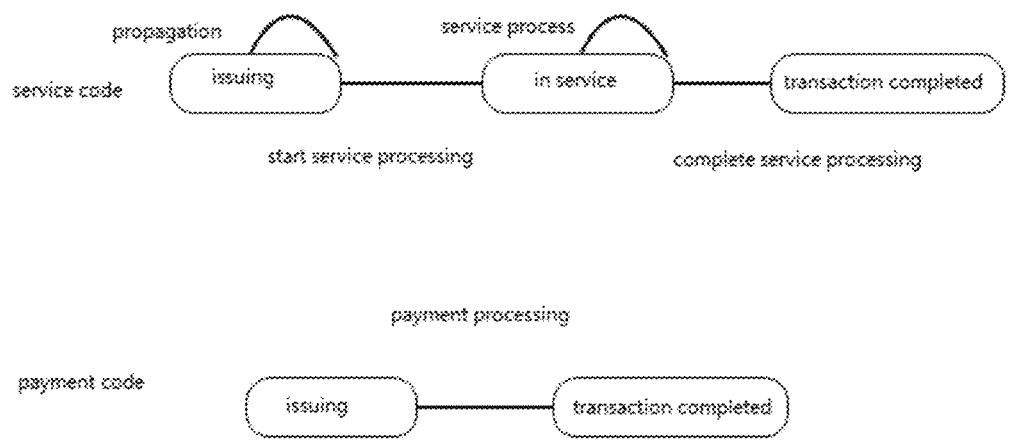
FIG. 14 shows a schematic diagram of state migration under the CodeChain authentication mechanism.

In the CodeChain authentication mechanism (i.e., transaction authentication technical structure), FIG. 12 shows formation of a CodeChain through a plurality of combinations of the service provider, agency, propagator, consumer, and etc.; FIG. 13 shows a process of calculation and verification, wherein the upper part of the transaction data structure is service code+state (e.g., corresponding to the service data transmitted by the consumer, propagator, and the service provider to each other), and the lower part is payment code+state (e.g., corresponding to the payment data transmitted by the consumer, propagator, and the service provider to each other); FIG. 14 shows a schematic diagram of state migration; the verification logic lies in: 1) recording the state of the service code; 2) verification of the state of the service code to two ends of the chain; 3) obtaining operation data and changing the state of the service code; 4) obtaining the payment operation data; 5) verifying the source of the payment code to form a payment chain; 6) changing the state of the payment code; 7) obtaining a rewarded payment code; 8) recording a complete transaction chain; afterwards, calculating the Hash value and forming historical data. The above are simplest records and verification logic; respective CodeChain subjects may customize the service code state and the payment code state migration; the MatrixLink protocol agrees on the information transmission event signal for state migration, and the final state cannot change.

The reward obtained by the propagator is based on the following considerations: the propagation and witness activities paid by the propagator are entitled to remunerations for their efforts so as to facilitate circulation of commodity information and verification of truth, which is different from the information processing manner of IP Internet. In the CodeChain technology, the information propagator would perform a quantized filtering to the information, and superimpose his own comments on the information over the original information; for false information, there is a relatively large probability for the recipient not to receive through an evaluation function of the propagator with respect to the information trueness. The morality index of the propagator will also be superimposed in the information, thereby forming a quantum entanglement effect between the propagator and the recipient. This entanglement effect should reflect the information trueness more accurately. The human activities follow the quantum laws. The traditional Internet information propagation manner cannot avoid data attack of network paid posters with their majority advantage, while the quantum computation may effectively avoid this dilemma.

In view of the above, the present disclosure provides a solution different from the existing Internet IP-IP interconnection and establishes a human-human interconnection-based manner to solve problems in information transmission; in order to enhance efficiency, the present disclosure innovatively proposes a quantum CodeChain idea, and provides a quantum CodeChain model, a digital person model, and a digital currency model; the preliminary stage of condensation of these models is two-dimensional code scanning, the upgrade stage is "viewing," while the premium state is "quantum CodeChain" access (thinking) in this example, which points out the road for further system development and application.

Although the contents of the present disclosure have been described in detail through the foregoing preferred embodiments, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

I claim:

1. A CodeChain-based service providing method, comprising:
   providing a CodeChain server, wherein the CodeChain server is configured to issue all coding media associated with at least one subject and to manage information related to a CodeChain formed by step-by-step propagation and to identify coding media associated with the at least one subject,
   wherein an initial node on the CodeChain corresponds to interaction between a service provider and the CodeChain server including a first terminal device associated with the service provider requesting issuance of an initial coding medium corresponding to a set of services provided by the service provider;
   identifying, by a second terminal device associated with a first user associated with the CodeChain, a respective coding medium corresponding to a previous node of the CodeChain associated with the at least one subject; and
   obtaining, by the second terminal device, an access address of the CodeChain server based on the respective coding medium;
   interacting, by the second terminal device, with the CodeChain server based on the access address;
   recording, by the CodeChain server:
   first time information and first location information associated with the first time information, wherein the first time information and the first location information are associated with the first terminal device when the identifying step is performed;
   first identification information associated with one of the first user and the second terminal device; and
   activity information associated with activity performed in the CodeChain associated with one of the first user and the second terminal device,
   wherein the first time information, first location information, first identification information and activity information provide a traceable node on the CodeChain;
   generating, by the second terminal, at least one of:
   a request to the CodeChain server to issue a second respective coding medium associated with the traceable node and the at least one subject and propagate the second respective coding medium, the second respective coding medium corresponding at least to information identifying the initial coding medium and the first identification information associated with one of the first user and the second terminal device; and
   a request to the CodeChain server to authenticate the second respective coding medium;
   receiving, by the second terminal device from the CodeChain server, after the CodeChain server authenticates the second respective coding medium, a service object list;
   and
   interacting, by the second terminal device based on the at least one service address included in the service object list, with at least one server of the service provider directed to by the at least one service address to obtain a service provided by the service provider;
   wherein a transaction between the first user and the service provider is witnessed by other nodes on the CodeChain and stored therein based on access to transaction information stored on the CodeChain server.

2. The CodeChain-based service providing method according to claim 1, wherein:
   the respective coding medium is issued by the CodeChain server;
   wherein when the at least one service is provided by the service provider, the CodeChain server issues the second respective coding medium after receiving at least one code issuance request from the service provider; wherein
   when a plurality of service providers provide respective services, the CodeChain server issues a plurality of second respective coding mediums based on a plurality of code issuance requests filed sequentially by the plurality of service providers; and
   wherein when the CodeChain server receives the at least one code issuance request filed by the service provider or the plurality of code issuance requests filed by the plurality of service providers, the CodeChain server issues the second respective coding medium or the plurality of second respective coding mediums after verifying the at least one service provider or the plurality of service providers based on digital person identity information of each respective service provider.

3. The CodeChain-based service providing method according to claim 1, wherein:
   the service object list includes a script indicating a service sequence and parameter, a respective service address associated with each of one or more service providers providing services, and a respective dynamic digital token corresponding to each of the one or more service providers, and wherein the respective dynamic digital token corresponding to each service provider includes a description of a scene in which the service provider provides the service and respective digital person identification information of the service provider.

4. The CodeChain-based service providing method according to claim 3, wherein:
   in the service object list, the respective service address of the respective service provider currently providing the service is indicated by the service sequence; and
   wherein the second terminal device associated with the first user integrates the parameter indicated by the script and data provided based on the parameter into a service parameter which is provided to the at least one server of the service provider directed to by the service address so as to obtain the service.

5. The CodeChain-based service providing method according to claim 1, wherein:

the second terminal device associated with the first user further obtains a dynamic digital token by identifying the prior coding medium, the dynamic digital token including a description of the scene in which the service provider provides the service and digital person identification information of the service provider.

6. The CodeChain-based service providing method according to claim 1, wherein the step of interacting with the Code Chain server includes:
receiving, by the CodeChain server, a request to authenticate the service provider based on a dynamic digital token which is obtained from identifying the coding medium and includes the digital person identity information of the service provider; and
sending, by the CodeChain server the service object list to the second terminal device in response to the request passing the authentication.

7. The CodeChain-based service providing method according to claim 1, wherein the step of interacting with the Code Chain server includes:
receiving by the CodeChain server a request to authenticate the prior coding medium; and
sending, by the CodeChain server, the service object list to the second terminal device in response to the request passing authentication.

8. The CodeChain-based service providing method according to claim 1, wherein the step of interacting with the at least one server of the service provider includes:
providing, by the first user using the second terminal device to the at least one server of the service provider, digital person identity information of the first user; and
providing, by the first user using the second terminal device to the at least one server of the service provider, the digital person identity information of the first user when interacting with the at least one server of the service provider; wherein
the digital person identity information of the first user corresponds to the first user and/or the second terminal device.

\* \* \* \* \*